United States Patent
Sekiguchi

(10) Patent No.: US 7,415,491 B2
(45) Date of Patent: Aug. 19, 2008

(54) METHOD AND APPARATUS FOR OPTIMIZING HEAP SIZE, AND PROGRAM AND PROGRAM RECORDING MEDIUM THEREOF

(75) Inventor: Katsutomo Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 540 days.

(21) Appl. No.: 10/738,179

(22) Filed: Dec. 17, 2003

(65) Prior Publication Data
US 2004/0133759 A1 Jul. 8, 2004

(30) Foreign Application Priority Data
Dec. 26, 2002 (JP) ............... 2002-378194

(51) Int. Cl.
*G06F 12/00* (2006.01)
(52) U.S. Cl. ............ 707/206; 707/10; 707/104.1; 711/170
(58) Field of Classification Search ......... 707/205–206, 707/10, 104.1; 711/170
See application file for complete search history.

(56) References Cited

U.S. PATENT DOCUMENTS

| | | | | |
|---|---|---|---|---|
| 5,566,321 A | * | 10/1996 | Pase et al. | 711/153 |
| 5,845,298 A | * | 12/1998 | O'Connor et al. | 707/206 |
| 6,049,810 A | * | 4/2000 | Schwartz et al. | 707/206 |
| 6,199,075 B1 | * | 3/2001 | Ungar et al. | 707/206 |
| 6,728,852 B1 | * | 4/2004 | Stoutamire | 711/170 |
| 6,795,836 B2 | * | 9/2004 | Arnold et al. | 707/206 |

OTHER PUBLICATIONS

Shaham et al.; "On the Effectiveness of GC in Java"; *The 2000 International Symposium on Memory Management*; Oct. 2000.
Yoshikawa et al.; "A Generational GC Scheme that Dynamically Adjusts New Generation Heap Sizes Based on an Efficiency Model"; Journal of Information Processing Society of Japan, Information of Japan; vol. 41, No. SIG9 (PRO8); pp. 78-87; Nov. 15, 2000.

* cited by examiner

*Primary Examiner*—Sathyanarayan Pannala
(74) *Attorney, Agent, or Firm*—Greer, Burns & Crain, Ltd.

(57) ABSTRACT

A logging unit logs data, including data on object generation/access and start/end of GC, information about object longevity when GC is performed, and data about a method call/return or the like. An analyzing unit organizes by object logged records, sorts that information about each object by time or size, and obtains changes in required heap size and a longevity characteristic of each object. An estimating unit uses a required heap size data and the object longevity characteristic to estimate an optimum heap size according to a criterion specified by a user.

6 Claims, 22 Drawing Sheets

FIG. 3A

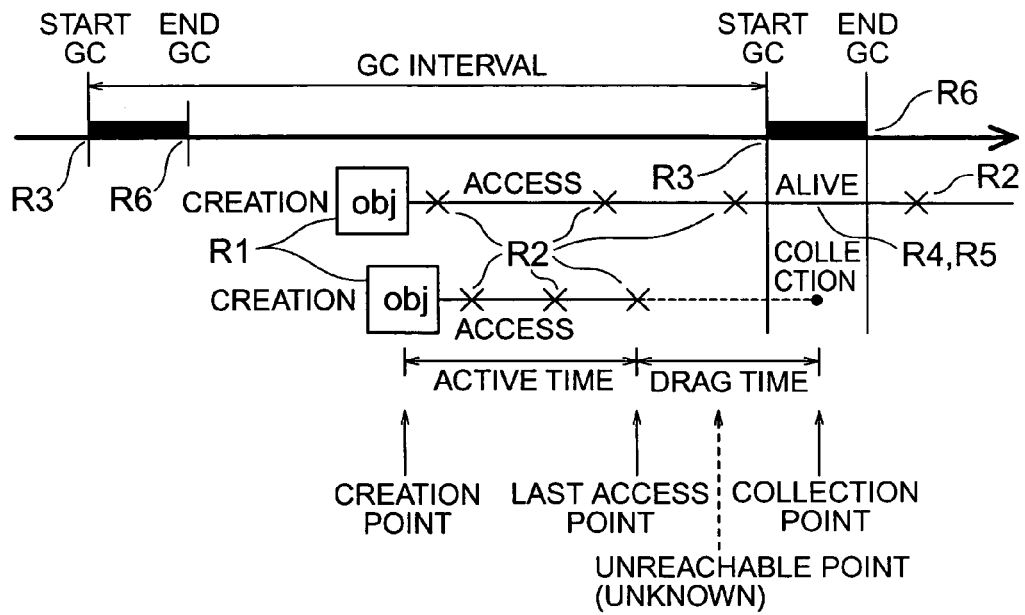

FIG. 3B

| RECORD TYPE | CONTENT |
|---|---|
| R1:obj- CREATION | [ADDRESS, SIZE, THREAD NUMBER, TIMESTAMP] |
| R2:obj- ACCESS | [ADDRESS, SIZE, THREAD NUMBER, TIMESTAMP] |
| R3:GC- START | [TIMESTAMP] |
| R4:obj- ALIVE (WHEN MOVED) | [SOURCE ADDRESS, DESTINATION ADDRESS, SIZE] |
| R5:obj- ALIVE | [ADDRESS, SIZE] |
| R6:GC- END | [TIMESTAMP, IN-USE HEAP SIZE IMMEDIATELY AFTER GC] |
| R7:method- CALL | [THREAD NUMBER, TIMESTAMP, METHOD NAME] |
| R8:method- RETURN | [THREAD NUMBER, TIMESTAMP, METHOD NAME] |

| METHOD | CREATED OBJECT | | | [TIME SERIES →] | | |
|---|---|---|---|---|---|---|
| xxx | A | | | | B | | C |
| yyy | | D | | E | | | |
| yyy2 | | | | | | F | |
| zzz | | | G | | | | |

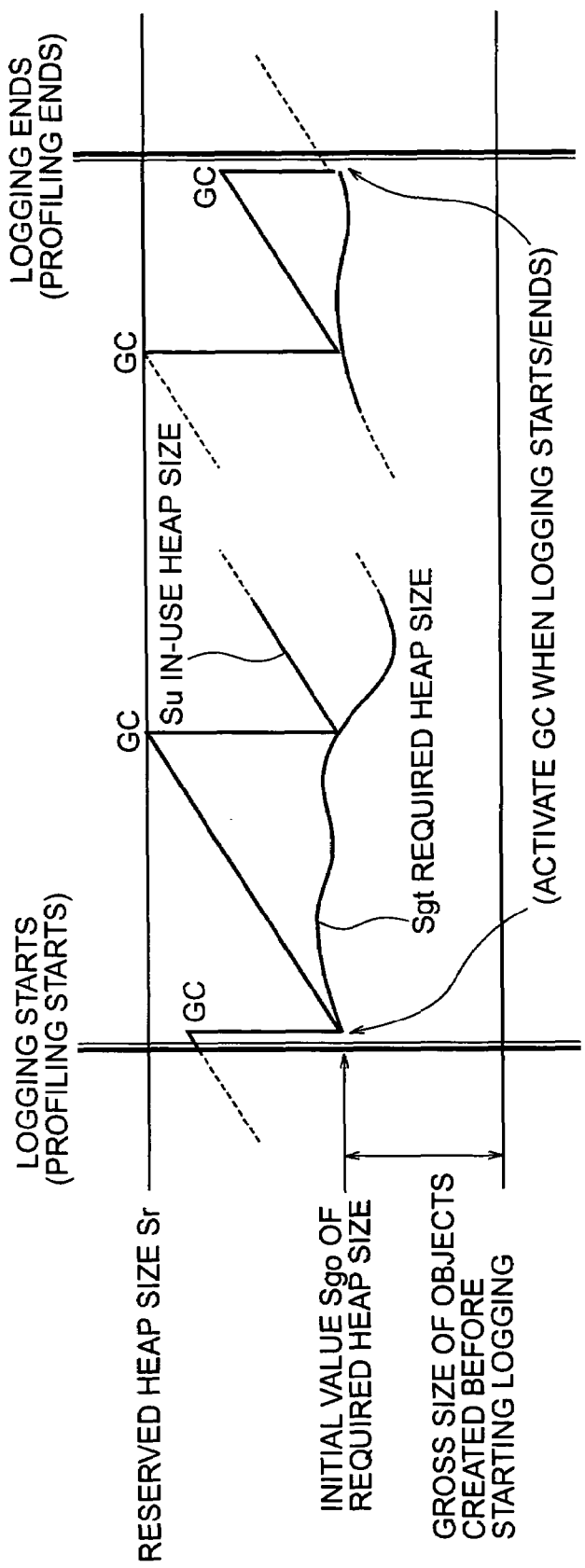

FIG. 9A
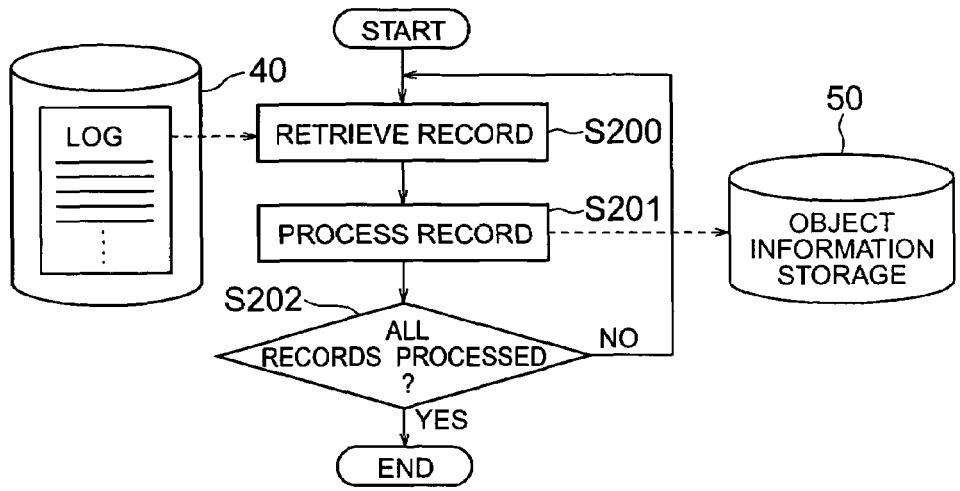
FIG. 9B
| HEADER | left | | | |
| | right | | | |
| | parent | | | |
| | balance | | | |
FIG. 9C
| DATA | | new | acc | GC |
|---|---|---|---|---|
| | addr | ○ | — | — |
| | size | ○ | — | — |
| | new_thread | ○ | — | — |
| | new_time | ○ | — | — |
| | last_time | — | ○ | — |
| | age | — | — | ○ |
| | is_global | — | ○ | — |
FIG. 9D
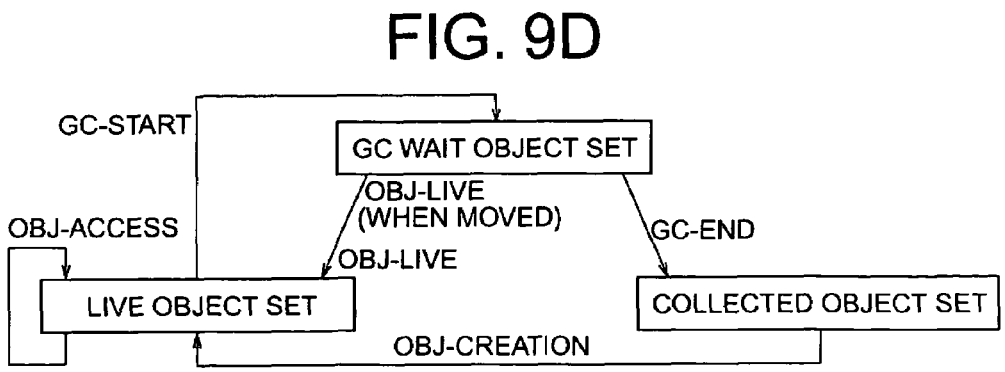

FIG. 10

| addr | size | new_thread | new_time | last_time | age | is_global |
|---|---|---|---|---|---|---|
| 200 | 10 | 5 | 40 | 120 | 1 | 1 |
| 300 | 4 | 3 | 45 | 60 | 0 | 0 |
| 350 | 20 | 5 | 70 | 140 | 1 | 0 |

FIG. 11A

| addr | time | total' | max' |
|---|---|---|---|
| 200 | 40 | 10 | 10 |
| 200 | 120 | 0 | -10 |
| 300 | 45 | 4 | 4 |
| 300 | 60 | 0 | -4 |
| 350 | 70 | 20 | 20 |
| 350 | 140 | 0 | -20 |

FIG. 11B

| addr | time | total' | max' |
|---|---|---|---|
| 200 | 40 | 10 | 10 |
| 300 | 45 | 4 | 4 |
| 300 | 60 | 0 | -4 |
| 350 | 70 | 20 | 20 |
| 200 | 120 | 0 | -10 |
| 350 | 140 | 0 | -20 |

FIG. 11C

| addr | time | total | max |
|---|---|---|---|
| 200 | 40 | 10 | 10 |
| 300 | 45 | 14 | 14 |
| 300 | 60 | 14 | 10 |
| 350 | 70 | 34 | 30 |
| 200 | 120 | 34 | 20 |
| 350 | 140 | 34 | 0 |

FIG. 12

| addr | size | longevity |
|---|---|---|
| 300 | 4 | 15 |
| 350 | 20 | 70 |
| 200 | 10 | 80 |

FIG. 19

OPTIMIZING HEAP SIZE - PROFILE DATA

```
645431 putfield: f57bff70(4) th-126c10 time(+982670)
645432 getfield: f542f090(20) th-126c10 time(+982670)
645433 new    : f57bff80(4) th-126c10 time(+982670)
645434 putfield: f57bff80(4) th-126c10 time(+982674)
645435 getfield: f542f090(20) th-126c10 time(+982674)
645436 new    : f57bff90(4) th-126c10 time(+982674)
645437 putfield: f57bff90(4) th-126c10 time(+982678)
645438 getfield: f542f090(20) th-126c10 time(+982678)
645439 new    : f57bffa0(4) th-126c10 time(+982678)
645440 putfield: f57bffa0(4) th-126c10 time(+982682)
645441 getfield: f542f090(20) th-126c10 time(+982682)
645442 new    : f57bffb0(4) th-126c10 time(+982682)
645443 putfield: f57bffb0(4) th-126c10 time(+982686)
645444 getfield: f542f090(20) th-126c10 time(+982686)
645445 new    : f57bffc0(4) th-126c10 time(+982686)
645446 putfield: f57bffc0(4) th-126c10 time(+982690)
645447 getfield: f542f090(20) th-126c10 time(+982690)
645448 new    : f57bffd0(4) th-126c10 time(+982690)
645449 putfield: f57bffd0(4) th-126c10 time(+982694)
645450 getfield: f542f090(20) th-126c10 time(+982694)
645451 new    : f57bffe0(4) th-126c10 time(+982694)
645452 putfield: f57bffe0(4) th-126c10 time(+982698)
645453 getfield: f542f090(20) th-126c10 time(+982698)
645454 [GC start] 982698. (645454)
645455 move   : f5400048 => f5400048
645456 move   : f5400058 => f5400058
645457 move   : f5428bd0 => f5428bd0
645458 move   : f5428c28 => f5428c28
645459 move   : f5428d00 => f5428d00
```

FIG. 20

| OPTIMIZING HEAP SIZE - OBJECT DATA | | | | | | | | |
|---|---|---|---|---|---|---|---|---|
| OBJECT NUMBER | SIZE | THREAD ID | CREATION TIME | LAST ACCESS TIME | LONGEVITY | NUMBER OF GCs | SCOPE | OBJECT NAME |
| 1326 | 4 | 108148 | 38350 | 38354 | 4 | 0 | L | java/util/Attributes |
| 1327 | 4 | 108148 | 38366 | 38386 | 20 | 0 | L | apl/file/Buffer |
| 1328 | 4 | 108148 | 38382 | 38386 | 4 | 0 | L | java/util/Attributes |
| 1329 | 6 | 108148 | 38940 | 199340 | 160400 | 1 | L | java/lang/String |
| 1330 | 12 | 108148 | 38950 | --- | --- | 3 | L | apl/file/Descriptor |
| 1331 | 22 | 108148 | 38992 | 199340 | 160348 | 1 | L | [array] |
| 1332 | 4 | 108148 | 39054 | 39670 | 616 | 0 | L | apl/main/Cache |
| 1333 | 4 | 108148 | 39582 | 191454 | 151872 | 1 | L | apl/main/Items |
| 1334 | 260 | 108148 | 39590 | 199336 | 159746 | 1 | L | [array] |
| 1335 | 8 | 108148 | 39866 | 197340 | 157474 | 1 | L | java/lang/ref/Finalizer |
| 1336 | 14 | 108148 | 39900 | 71220 | 31320 | 0 | L | apl/main/LargeNode |
| 1337 | 14 | 108148 | 39914 | 46484 | 6570 | 0 | L | apl/main/LargeNode |
| 1338 | 14 | 108148 | 39936 | 46848 | 6912 | 0 | L | apl/main/LargeNode |
| 1339 | 6 | 108148 | 40026 | 199340 | 159314 | 1 | L | java/lang/String |
| 1340 | 14 | 108148 | 40032 | --- | --- | 3 | L | [array] |
| 1341 | 12 | 108148 | 40214 | 40364 | 140 | 0 | L | apl/elem/C1 |
| 1342 | 12 | 108148 | 40498 | 41862 | 1364 | 0 | L | apl/elem/C1 |
| 1343 | 14 | 108148 | 42560 | 43756 | 1196 | 0 | L | apl/main/LargeNode |
| 1344 | 30 | 108148 | 42984 | --- | --- | 3 | G | apl/cnt/ScheduleManager |
| 1345 | 20 | 108148 | 43022 | --- | --- | 3 | G | apl/cnt/Synchronizer |
| 1346 | 56 | 108148 | 43852 | --- | --- | 3 | G | apl/cnt/Map |
| 1347 | 24 | 108148 | 44162 | 197554 | 153392 | 1 | L | [array] |
| 1348 | 110 | 108148 | 45292 | --- | --- | 3 | L | [array] |
| 1349 | 26 | 108148 | 46848 | 50456 | 3608 | 0 | L | apl/main/Random |
| 1350 | 26 | 108148 | 46878 | 50456 | 3578 | 0 | L | apl/main/Random |
| 1351 | 48 | 108148 | 50460 | 57672 | 7212 | 0 | L | [array] |
| 1352 | 48 | 108148 | 50508 | 57672 | 7164 | 0 | L | [array] |
| 1354 | 92 | 108148 | 57676 | 76024 | 18348 | 0 | L | [array] |
| 1355 | 92 | 108148 | 57776 | 76024 | 18248 | 0 | L | [array] |

BACK

FIG. 22

OPTIMIZING HEAP SIZE - METHOD LIST

METHOD LIST apl/file/Buffer/inputcode()
apl/file/Buffer/inputdate()
apl/file/Buffer/length()
apl/file/Buffer/ownerpriority()
apl/file/Buffer/testdate()
apl/file/Buffer/type()
apl/file/Buffer/outputdate()
apl/file/Buffer/outputdate()
apl/file/Descriptor/attach()
apl/file/Descriptor/detach()
apl/file/Descriptor/isused()
apl/file/Descriptor/reclaim()
apl/main/Cache/alloc()
apl/main/Cache/bind()
apl/main/Cache/free()
apl/main/Cache/read()
apl/main/Cache/time()
apl/main/Cache/unbind()
apl/main/Cache/write()
apl/main/Items/getID()
apl/main/Items/getworklist()
apl/main/Items/setdate()
apl/main/Items/setID()
apl/main/Items/setitem()
apl/main/Items/setlocale()
apl/main/Items/setPlevel()
apl/main/Items/setSlevel()
apl/main/Items/setuser()
apl/main/Items/setvalue()
apl/main/Items/setVlevel()

CREATED OBJECT

| OBJECT NAME | OBJECT NUMBER | CREATION TIME | LAST ACCESS TIME |
|---|---|---|---|
| apl/file/Buffer | 1327 | 38366 | 38386 |
| apl/file/Buffer | 2518 | 51888 | 51928 |
| apl/file/Buffer | 2673 | 53460 | 53518 |

ACCESSED OBJECT

| OBJECT NAME | OBJECT NUMBER | CREATION TIME | LAST ACCESS TIME |
|---|---|---|---|
| apl/file/Buffer | 1327 | 38366 | 38386 |
| apl/file/Buffer | 2518 | 51888 | 51928 |
| apl/file/Buffer | 2673 | 53460 | 53518 |
| apl/file/Descript.. | 1330 | 58950 | --- |

BACK

METHOD AND APPARATUS FOR OPTIMIZING HEAP SIZE, AND PROGRAM AND PROGRAM RECORDING MEDIUM THEREOF

BACKGROUND OF THE INVENTION

1. Field of the Invention

This invention relates to method and apparatus for optimizing a heap size, and program and program recording medium thereof, and more particularly to method and apparatus for automatically optimizing a heap size, and program and program recording medium thereof for obtaining an optimum heap size in a computer system that implements a garbage collection.

2. Description of the Related Art

Hereinafter the term garbage collection is abbreviated to GC. Examples of computer systems that implement GC include JVM (Java Virtual Machine, Java:trademark). While the present invention will be described herein with respect to a JVM as an example of computer systems implementing GC, the systems to which the present invention can be applied are not limited to JVM.

In general, it has been difficult to estimate (predict) the amount of memory required for programs such as Java programs that dynamically reserve memory (for example, see non-patent document 1).

Among the measures of the performance of a computer running applications, a throughput and a response performance are impacted by GC. The term "throughput" herein refers to the amount of work processed by an application per unit time. The term "response performance" herein refers to the uniformity of the time between an input by a user to an output to the user. The more uniform the time is, the higher the response performance is.

During GC, a user program is stopped. If the starting frequency of GC is high, the throughput decreases because the user program stops every time when GC is started. Therefore, to improve the throughput, a larger heap size is desirable to decrease the starting frequency of GC, which is a cause of reduction in the throughput.

On the other hand, to improve the response performance, a smaller heap size is desirable to reduce processing cost per GC. This is because high processing cost per GC increases the time during which the system pauses due to the blockage of the heap by GC. If GC is not running when a transaction is provided from the user, the system can immediately respond to it. If GC is running, the system cannot respond to the transaction until the GC ends. If processing cost per one GC is high, a response time to the user during GC and a response time to the user not during GC are not uniform. Then, response performance lowered.

To solve the above described problems, the following measures have been taken. In order to improve the throughput, the heap size is set larger. In order to improve response performance, the heap size is minimized as small as possible. However, it is impossible to simultaneously meet these mutually contradictory conditions. In practice, it is extremely difficult to obtain a necessary and optimum heap size.

Therefore, a conventional practice is as follow. The heap size is increased when a heap shortage is caused, and the heap size is decreased when the response performance is degraded due to GC performance degradation caused by an enormous heap size, then each time the heap size is increased or decreased the system must be rebooted.

Further, it is a prior art that GC is frequently performed to reduce object drag time (the lag between the time an object is last accessed and the time it is collected by GC during which the heap is used unnecessarily) (for example see non-patent document 2). This is an approach to reduce the time lag (herein drag time) and to process in the Java application on a JVM. However, frequently running GC places a large burden on the system, thereby extremely reducing the throughput.

Non-patent document 1 is "Save Memory Programming, Software Patterns for System with Limited Memory" by James Noble and Charles Weir (Piason Education, p. 269).

Non-patent document 2 is "On the Effectiveness of GC in Java" by Ran Shaham, Elliot K. Kolodner, and Mooly Sagiv (The 2000 International Symposium on Memory Management (ISMM'00), October 2000).

The prior art approaches described above cannot automatically determine any optimum compromise between the throughput and the response performance when a given Java application is executed. Moreover, they provide a poor accuracy of heap estimation and require a number of trials until an optimum heap size is found, resulting in an enormous work cost.

SUMMARY OF THE INVENTION

An object of the present invention is to provide an automatic heap size optimizing measure that allows an optimum heap size to be automatically obtained by trading off throughput against response performance in a computer system (JVM or the like) that implements GC in order to solve the above-described problems.

Another object of the present invention is to provide an automatic heap size optimizing method that allows an optimum heap size to be automatically obtained in a computer system (JVM or the like) that implements GC.

Yet another object of the present invention is to provided an automatic heap size optimizing apparatus that allows an optimum heap size to be automatically obtained in a computer system (JVM or the like) that implements GC.

Yet another object of the present invention is to provide an automatic heap size optimizing program that allows an optimum heap size to be automatically obtained in a computer system (JVM or the like) that implements GC.

Yet another object of the present invention is to provide a storage medium recording an automatic heap size optimizing program that allows an optimum heap size to be obtained in a computer system (JVM or the like) that implements GC.

An automatic heap size optimizing method of the present invention is an automatic heap size optimizing method for automatically optimizing a heap size in a computer system that implements garbage collection. The method comprises a first step of collecting and recording profile data concerning identification information, size information, or time information about a created object or a live object for calculating a longevity of the object, at least at creation of the object, at access to the object, and at garbage collection, a second step of analyzing the recorded profile data, calculating the longevity of each object, and adding up sizes of live objects to obtain a required heap size at a given time, and a third step of determining a target heap size according to a criterion predetermined from a balance between throughput performance and response performance or a criterion specified by an operator by using a longevity characteristic concerning the longevity of each object and the required heap size calculated in the second step.

An automatic heap size optimizing apparatus of the present invention is an automatic heap size optimizing apparatus in a computer system that implements garbage collection. The apparatus comprises a logging unit to collect and record profile data concerning identification information, size information, or time information about a created object or a live object for calculating a longevity of the object, at least at creation of the object, at access to the object, and at garbage collection, an analyzing unit to analyze the recorded profile data, calculating the longevity of each object, and adding up the sizes of live objects to obtain a required heap size at a given time, and an estimating unit to determine a target heap size according to a criterion predetermined from a balance between throughput performance and response performance or a criterion specified by an operator by using a longevity characteristic concerning the longevity of each object and the required heap size calculated in the analyzing unit.

A program of the present invention is a program for causing a computer to perform an automatic heap size optimizing method in a computer system that implements garbage collection. The program causes the computer to perform: collecting and recording profile data concerning identification information, size information, or time information about a created object or a live object for calculating a longevity of the object, at least at creation of the object, at accesses to the object, and at garbage collection, analyzing the recorded profile data, calculating the longevity of each object, and adding up sizes of live objects to obtain a required heap size at a given time, and determining a target heap size according to a criterion predetermined from a balance between throughput performance and response performance or a criterion specified by an operator by using a longevity characteristic concerning the longevity of each object and the required heap size calculated.

A recording medium of the present invention is a recording medium recording a program for causing a computer to perform an automatic heap size optimizing method in a computer system that implements garbage collection. The program causes the computer to perform, collecting and recording profile data concerning identification information, size information, or time information about a created object or a live object for calculating a longevity of the object, at least at creation of the object, at access to the object, and at garbage collection, analyzing the recorded profile data, calculating the longevity of each object, and adding up sizes of live objects to obtain a required heap size at a given time, and determining a target heap size according to a criterion predetermined from a balance between throughput performance and response performance or a criterion specified by an operator by using a longevity characteristic concerning the longevity of each object and the required heap size calculated.

BRIEF DESCRIPTION OF THE DRAWINGS

FIGS. 3A and 3B show examples of collection timings of profile information and data records.

FIG. 8 shows an example in which profiling is started during execution of an application.

FIGS. 9A to 9D show a data reduction process according to the present embodiment.

FIG. 10 shows an example of object information according to the present embodiment.

FIGS. 11A to 11C show an example of sorting for tracking in-use heap size and active heap size according to the present embodiment.

FIG. 12 shows an example of sorting for obtaining an object longevity characteristic according to the present embodiment.

FIG. 19 shows an example of a profile data screen according to the present embodiment.

FIG. 20 shows an example of an object data screen according to the present embodiment.

FIG. 22 shows an example of a method list screen according to the present embodiment.

DETAILED DESCRIPTION OF THE PREFERRED EMBODIMENTS

Figure 1:
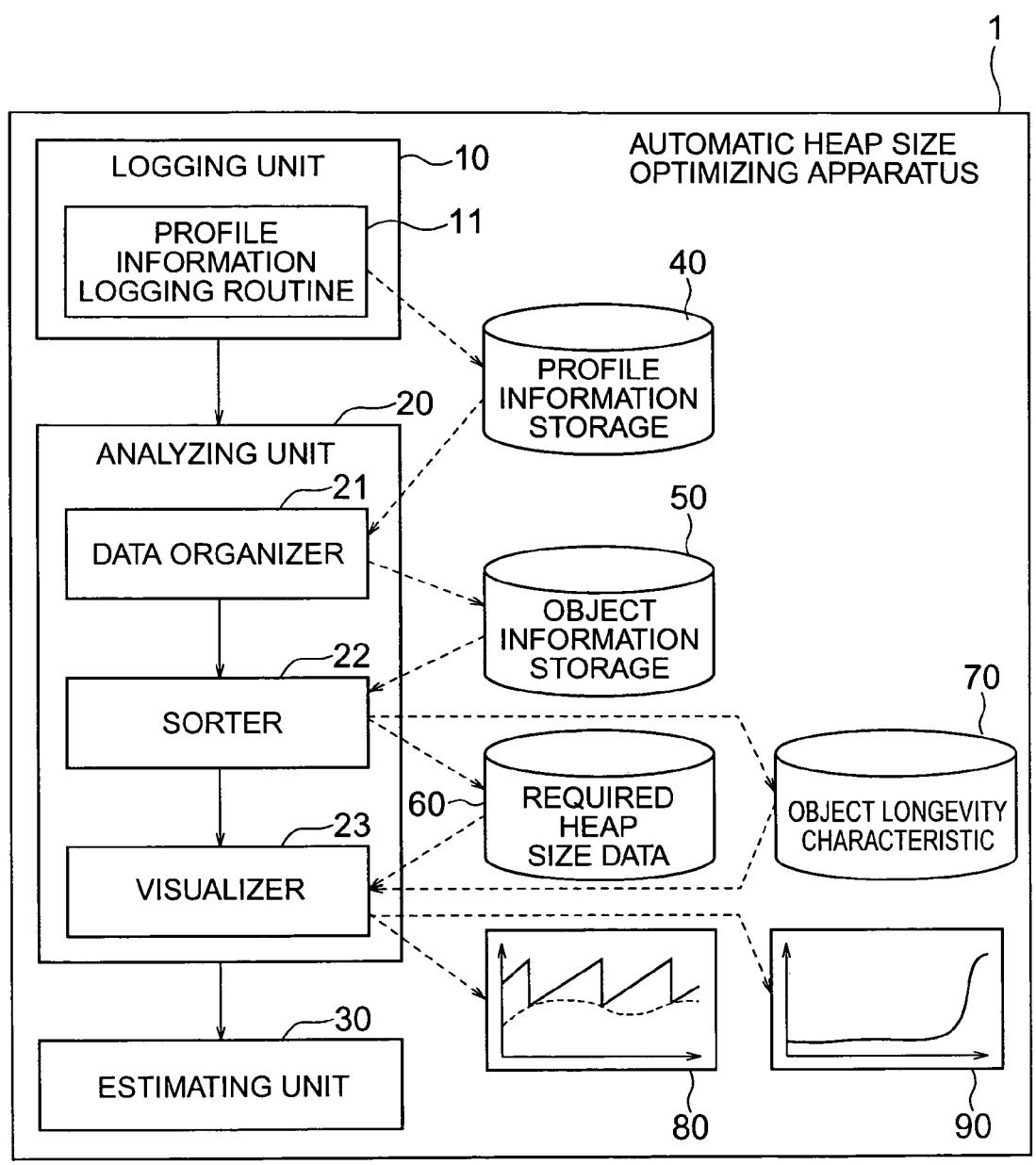
FIG. 1 shows an exemplary structure of an automatic heap size optimizing apparatus according to an embodiment of the present invention.

To attain these object, the present invention has a feature that the minimum heap size required for retaining live objects (objects reachable from a root) in order to obtain optimum response performance, the longevity of an object is profiled in order to improve throughput to an extent that does not significantly degrade the response performance, and the GC interval is adjusted on the basis of predetermined criteria so as to collect most objects by GC at once (to improve collectability) or criteria specified by an operator to give preference to throughput (collectability of unnecessary objects) over response performance (heap usage efficiency), thus obtaining an optimum heap size.

In particular, a computer system implementing garbage collection (GC) includes a logging unit, an analyzing unit, and estimating unit. The logging unit collects information about the longevity and size of objects. The analyzing unit accumulates the size of live object at a given time point on the basis of the longevity of the objects to obtain a heap size required at that time. It changes the required heap size along the time series to obtain the minimum heap size required in the whole system. The estimating unit obtains an optimum heap size so that a balance is ensured between the collectability of garbage objects and the GC interval that is adapted to the longevity that occupies the relatively largest amount of heap size in the whole system in a range over the minimum required heap size.

Profiling data may be data concerning some of the objects of objects during a certain period of time. The measure of longevity may be an actual period of time or a gross allocation size (longevity may be the total allocation at object creation time to the total allocation at the end). That is, the measure of longevity may be an actual period of time (seconds) or the gross allocation size (bytes).

Processing by the logging unit, analyzing unit, and estimating unit can be implemented by a computer and a software program. The program can be stored on a computer-readable storage medium or supplied over a network.

Prior to the description of embodiments of the present invention, the meaning of terms used in the description will be briefly described.

Response performance: Uniformity of time that elapses between the input of a request by a user and provision of the requested data to the user. The more uniform the time is, the higher the response performance is.

Throughput performance: The amount of work processed by an application per unit time.

Object longevity: Time between the creation of an object and the last access to the object (Here, "time" is actual time or the gross allocation size).

Real object longevity: Time elapses from the time an object is created until the object becomes unreachable).

Active heap size: The gross number of objects at a point of time that are created and are no longer accessed.

Reserved heap size: Heap size reserved in the system.

In-use heap size: The total number of objects that actually reside in the heap at a point of time.

Required heap size: The number of objects at a point of time that are created and becomes unreachable.

Unreachable object: Objects that cannot be reached from a root, which are regarded by the system unnecessary and collected by the next GC.

Profile: To log and analyze information within the system.

Drag time: Time between the last access to an object to the collection of the object during which a heap is used unnecessarily.

Thread local: Being unaccessible from other threads than the thread that created the object.

FIG. 1 shows an exemplary structure of an automatic heap size optimizing apparatus according to an embodiment of the present invention. An automatic heap size optimizing apparatus 1 according to the present embodiment is a computer comprising a CPU, memory and other components and includes a logging unit 10, an analyzing unit 20, and an estimating unit 30, which are implemented by a software program or the like. The logging unit 10 includes a profile information logging routine 11. The analyzing unit 20 includes a data organizer 21, a sorter 22, and a visualizer 23.

The logging unit 10 uses the profile information logging routine 11 to log the address and size of an object, the thread number, timestamp and other records in a profile information storage 40 when the object is created or accessed, when GC is started or ended, when a method is called or returned. The stored records are called profile information.

The analyzing unit 20 analyzes profile information collected by the logging unit 10 and creates object information such as the address and size of each object, a thread created for the object, creation time, the time which is last accessed, the number of GC runs, the thread scope for the object. The analyzing unit 20 uses the object information to calculate the longevity of each object as well as the size of live objects to calculate the required heap size at a given point of time.

The data organizer 21 of the analyzing unit 20 combines pieces of profile information read from the profile information storage 40 on an object-by-object basis to generate object information and stores it in an object information storage region 50. The sorter 22 sorts object information stored in the object information storage region 50 on the basis of various conditions and calculates required heap size data 60 and object longevity characteristic 70. The visualizer 23 edits data such as the required heap size data 60 and object longevity characteristic 70, which are the result of the analysis, in visible form such as a graph and outputs it onto a display or a printer. Reference numeral 80 in FIG. 1 denotes a graph of required and in-use heap sizes and reference numeral 90 denotes a graph of object longevity distribution.

The estimating unit 30 automatically estimates an optimum reserved heap size by using the result of analysis of profile information in the analyzing unit 20 and criteria predetermined according to trade-off between throughput performance and response performance. At this time the criteria used for determining the optimum reserved heap size may be provided by a user and the optimum reserved heap size may be automatically estimated according to the criteria.

Figure 2:
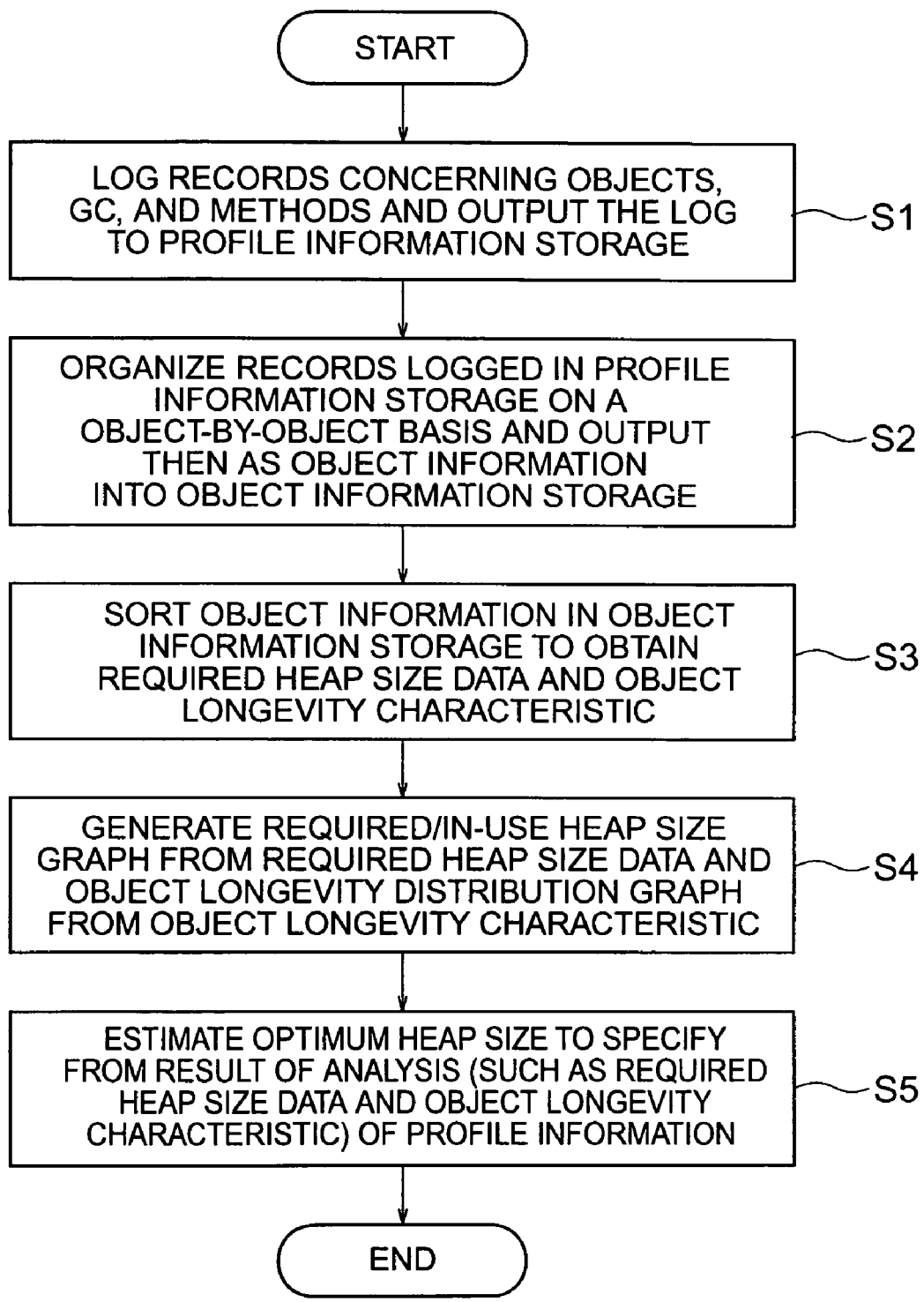
FIG. 2 is a flowchart of an automatic heap size optimizing process according to the present embodiment.

FIG. 2 shows a flowchart of an automatic heap size optimizing process according to the present embodiment. First the logging unit 10 uses the profile information logging routine 11 to log information on creation of an object, access to the object, start and end of GC, object longevity information, records concerning a method call/return and outputs the log to the profile information storage 40 (step S1).

The analyzing unit 20 uses an obj structure to organize the records recorded in the log in the profile information storage 40 on an object-by-object basis and outputs the records as object information to the object information storage 50, by the data organizer 21 (step S2). The analyzing unit 20 sorts the object information stored in the object information storage 50 to obtain required heap size data 60 and an object longevity characteristic 70, by the sorter 22 (step S3). Furthermore, the analyzing unit 20 creates a required/in-use heap size graph 80 from the required heap size data 60 and an object longevity distribution graph 90 from the object longevity characteristic 70 and outputs them, by the visualizer 23 (step S4).

The estimating unit 30 uses the results of the analysis (such as the required heap size data 60 and he object longevity characteristic 70) of the profile information obtained in the analyzing unit 20 to automatically estimate an optimum reserved heap size (step S5).

FIG. 3 shows examples of collection timings of profile information and data records according to the present embodiment. In particular, FIG. 3A shows a relationship between a flow from the creation of objects to the collection of the objects and GC as well as timings of profile information collection. FIG. 3B shows a format of records (data record format) logged in the flow shown in FIG. 3A. In FIG. 3, "obj" indicates each individual object.

Timing of profile information logging by the logging unit 10 are: at the times of creating an object (record R1), accessing the object (record R2), starting and ending GC (record R3, R6), determining whether or not the object is alive in CG processing (record R4, R5), calling a method of the object (record R7), and returning from the called object (record R8). In addition, log data is outputted when a profile interval starts and when the interval ends.

In FIG. 3A, when an object is created, record R1 is logged. When the object is accessed for reference or update, record R2 is logged. This is repeated until the last access. The time between the creation of an object and the last access to the object is called active time.

When the object cannot be reached from a root, the object becomes unreachable (unreachable object) and collected at the next GC. The interval from the time an object is last accessed until the object is collected by GC is called drag time.

On starting and ending GC, records R3 and R6, respectively, are logged records R4 and R5 of objects that are not collected by GC (that remain alive after GC) are logged. The interval between the time the GC starts and time the next GC starts is called a GC interval.

In FIG. 3B, obj-Creation (record R1) indicates the record that is recorded when the object is created. At this time items of information such as the address and size of the created object and the number of the thread that created the object, and a timestamp indicating the time at which the object was created are logged. While an address is used to identify an object in the present embodiment, other identification may be logged.

Obj-Access (record R2) indicates the record logged when the object is accessed. Items of information such as the address and size of the object the number of the thread that accessed the object, and a timestamp indicating the time at which the object was accessed are logged.

GC-Start (record R3) and GC-End (record R6) indicates records that are recorded at the start and end of GC. Items of information such as the timestamps indicating the start and end times of GC and an in-use heap size immediately after GC are logged. If the gross allocation size (bytes) is used as the measure of time, the timestamp indicating the GC end time is unnecessary.

The gross allocation size will be described below. The gross allocation size is the cumulative sum of sizes of objects that are successively added in the order in which they are created. The cumulative sum of the sizes of objects in the order of creation increases monotonously with time. The gross allocation size can be used to represent a lapse of time. The gross allocation size increases every time an object is created and is not reset after GC. Therefore, virtually it makes no difference whether an actual amount of time or a gross allocation size is used as the measure of longevity (time). However, at the time of determining GC interval if greater importance is placed on utilization of the heap, preferably the gross allocation size should be used as the measure because time intervals are decided in relation to the amount of the heap used. In contrast, in a system that requires that response performance be ensured in terms of actual time, it is preferable that actual time should be used as the measure.

For example, if, starting with a gross allocation size of 0 [bytes], the following events were performed in this order,
(1) Creation of object A (size: a [bytes])
(2) Creation of object B (size: b [bytes])
(3) Access to object A
(4) Start and end of GC
(5) Creation of object C (size: c [bytes]), then the time at each time each event occurred can be represented as follows:
(1) Time at which object A was created . . . 0 [bytes]
(2) Time at which object B was created . . . a [bytes]
(3) Time at which object A was accessed . . . a+b [bytes]
(4) GC start time and end time . . . a+b [bytes]
(5) Time at which object C was created . . . a+b [bytes].

In FIG. 3B, obj-Live (when moved) (record R4) and obj-Live (record R5) indicate records that are logged when objects are found during GC that will remain alive after GC (that will not be collected by GC). The locations of live objects may or may not be moved by GC. If the location of an object is moved by GC, records such as the source address, destination address, and size of the object are logged. On the other hand, if the location of an object is not moved by GC, then records such as the address and size of the object are logged.

Method-Call (record R7) and method-Return (record R8) indicate records that are logged when a method call/return occurs. Records such as the thread number of the thread in which the method call/return occurs, the timestamp indicting the time at which the method is entered/left, and the name of the method are logged. As will be described later, the information can be analyzed to find a method that was being performed when the object was created and to Know which method is placing a burden on the heap.

The analyzing unit 20 analyzes profile information that is logged as shown in FIG. 3 when each object, which were collected by GC, was created or accessed in order to know the longevity of the object.

The longevity of an object herein is actually a period between the time the object is created and the time it becomes unreachable and is expressed by time or gross allocation size. However, the longevity of an object to an unreachable point cannot be determined directly from profile information because no records concerning the object are logged at the unreachable point. Therefore, according to the present embodiment, the interval between the object creation point and the last access to the object is assumed to be the longevity of the object (hereinafter simply called the object longevity) and the true longevity of an object (hereinafter simply called the real object longevity) from the creation of the object to the time it becomes unreachable is estimated from the object longevity as described below.

Here, the size of gross live object size immediately after GC is represented by Sg and the active heap size immediately after GC is represented by Sa. The interval from the last access point indicating a reachable object during drag time to the unreachable point can be estimated as follows:

Gross object size in drag time immediately after GC=Gross live object size (Sg) immediately after GC-active heap size (Sa) immediately after GC  (Eq. 1)

In Eq. 1, the gross live object size (Sg) is the gross size of objects immediately after GC that are in the state from their creation points to unreachable points. The active heap size (Sa) immediately after GC is the gross size of objects immediately after GC that are in the state from their creation points to last access points. The gross object size in drag time immediately after GC is the gross size of objects immediately after GC that are in the state from their creation points to unreachable points.

A drag factor (K), which is the value of the gross live object size (Sg) immediately after GC over the active heap size (Sa) immediately after GC is obtained as:

$$K=Sg/Sa \qquad (Eq.\ 2)$$

As described above, the required heap size represents the gross size of objects in the state from their creation points to unreachable points at a certain point of time. The required heap size can be obtained from the active heap size at that time, which is the gross size of the objects in the state from their creation points to last access points, and the drag factor (K) obtained from equation 2, as follows:

$$\text{Required heap size}=\text{active heap size} \times K \qquad (Eq.\ 3)$$

Where, the required heap size after GC is equal to the gross live object size (Sg) after GC.

Figure 4:
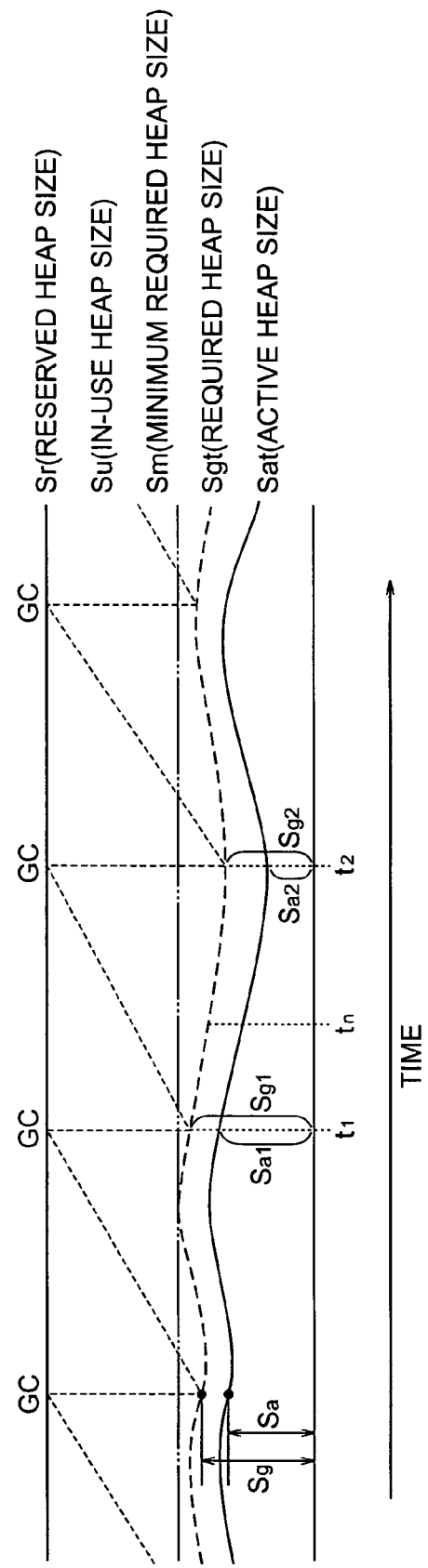
FIG. 4 is a diagram for illustrating changes over time in active heap size, required heap size, in-use heap size, and reserved heap size of the present invention.

FIG. 4 show a diagram illustrating changes in active heap size Sat, required heap size Sgt, in-use heap size Su, and reserved heap size Sr with time. In FIG. 4, a solid curve indicate the active heap size Sat and a dashed line indicates the required heap size Sgt. The sawtooth dotted line indicates the in-use heap size Su and the solid straight line at the top indicates the reserved heap size Sr. When the in-use heap size Su reaches the reserved heap size Sr, GC is executed.

Every time GC is executed, the drag factor (K) is obtained from the ratio of the active heap size (Sa) immediately after GC and the gross live object size (Sg) immediately after GC (see Eq. 2). Subsequently, the active heap size Sat is multiplied by the drag factor (K) (see Eq. 3) at a given time point to obtain the required heap size Sgt at that time point.

The equation for obtaining the drag factor (K) is not limited to Eq. 2. For example, letting Sa1 and Sg1 be the active heap size immediately after GC and the gross live object size immediately after GC, respectively, at time t1, and Sa2 and Sg2 be the active heap size immediately after GC and the gross live object size immediately after GC at time t2, then the drag factor (Kn) at time tn can be obtained as:

$$Kn=(Sg1/Sa1)\times((t2-tn)/(t2-t1))+(Sg2/Sa2)\times((tn-t1)/(t2-t1))$$ (Eq. 4)

In FIG. 4, a double-dashed line indicates the maximum value of required heap size, which is assumed here to be the minimum required heap size Sm. The reserved heap size Sr can be reduced to the minimum required heap size Sm. The closer the reserved heap size Sr to the minimum required heap size Sm is, the shorter GC interval becomes and the more frequently GC is performed. In contrast, the further the reserved heap size Sr from the minimum required heap size Sm is, the longer GC interval becomes and the longer the time from the start to end of one GC becomes.

The analyzing unit 20 multiplies the longevity of an object from its creation point to the last access by the drag factor (K or Kn) obtained from Eq. 2 or 4 to estimate the real object longevity.

Figure 5:
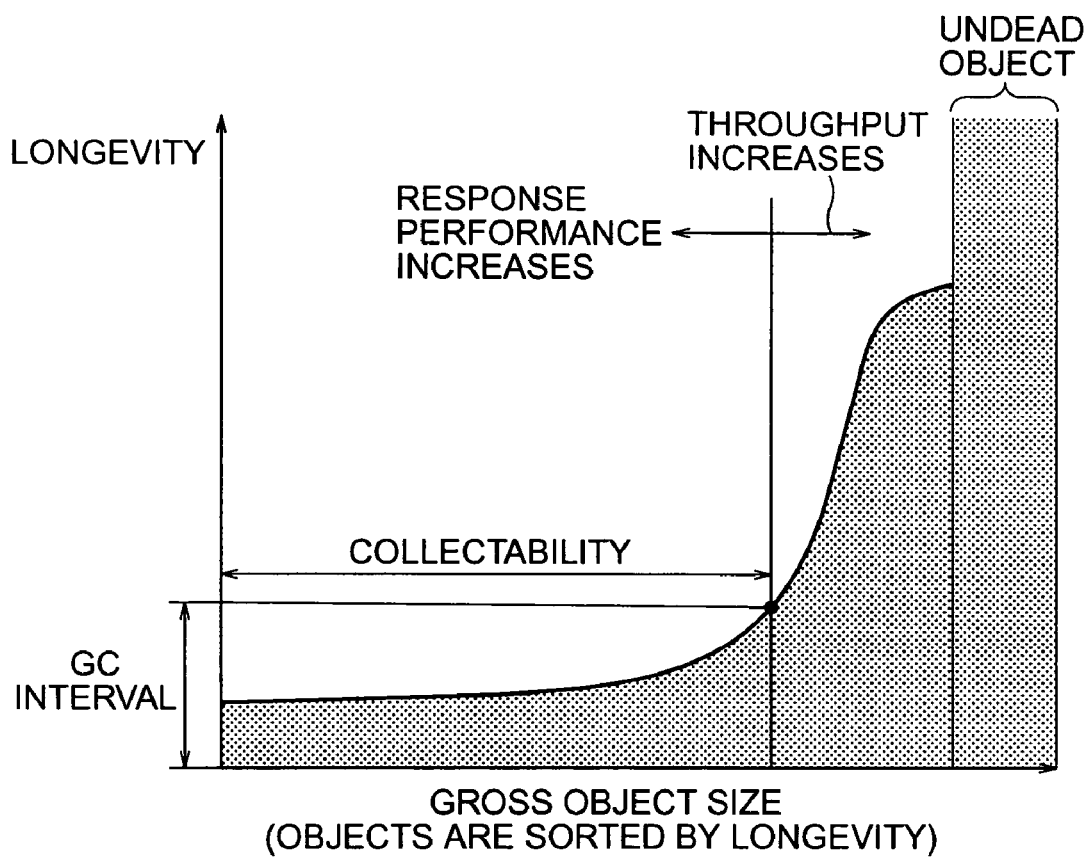
FIG. 5 is a diagram for illustrating heap size adjustment based on a longevity of an object.

FIG. 5 shows a diagram illustrating adjustment of the heap size on the basis of object longevity according to the present embodiment. A horizontal axis of the graph shown in FIG. 5 represents the gross object size and a vertical axis represents the object longevity. Objects are sorted in ascending order of longevity. A curve (called object longevity distribution curve) shown in FIG. 5 can be obtained by plotting a relation between the object longevity and the gross object size. "Undead objects" in the rightmost part of the graph shown in FIG. 5 are objects that are not collected by GC and the longevity of which cannot be estimated by the analyzing unit 20 and are therefore ignored.

Gross object size (hereinafter simply called gross size) is the size obtained by adding the sizes of objects in ascending order of longevity. For example, let us consider the following objects:

Object A: Longevity 20 [bytes], size a [bytes]
Object B: Longevity 250 [bytes], size b [bytes]
Object C: Longevity 48 [bytes], size c [bytes].

If these objects are sorted in ascending order of longevity, the order of objects will be: object A, C, and B. The gross size of the objects will be as follows:

Object A: Gross size: a [bytes]
Object C: Gross size: a+c [bytes]
Object B: Gross size: a+c+b [bytes].

In the graph shown in FIG. 5, a thick vertical line near the center indicates the gross object size at which the object longevity becomes equal to the length of a GC interval on the object longevity distribution curve. The objects (each having a shorter longevity) to the left of this line can be collected without undergoing any second GC. The ratio of the gross size at the position of the thick line to the total size of profiled objects is called a collectability.

If the GC interval is set long, the thick line in FIG. 5 shifts to the right and objects having a longer longevity can be collected without undergoing the second GC. As a result, the time between the start and end of GC becomes long but GC is executed less frequently, resulting in higher throughput.

If the GC interval is set short, the thick line in FIG. 5 shifts to the left and more objects undergo more than one GC before collection. Consequently, GC is executed more frequently but the time between the start and end of one GC is reduced, therefore improving response performance.

The estimating unit 30 automatically estimates an optimum reserved heap size Sr from the result of analysis of profile information by the analyzing unit 20. The criterion for determining the optimum reserved heap size can be preset by a system developer or an application developer. The criterion for determining the optimum reserved heap size may be specified by an application user and the estimating unit 30 may automatically estimate the optimum reserved heap size according to the criterion.

For example, if a user specifies a criterion that determines a GC interval, the GC interval (hereinafter called an optimum GC interval) for performing GC at an optimum timing is determined on the basis of object longevity distribution as shown in FIG. 5.

Then, an optimum reserved heap size is obtained from the determined optimum GC interval. For example, if the optimum GC interval is equal to a value twice as large as the GC interval during profiling, a value simply twice as large as the reserved heap size during the profiling is the optimum reserved heap size. Likewise, if one half of the GC interval during profiling is the optimum GC interval, a value half the value of the reserved heap size during the profiling becomes the optimum reserved heap size.

Effects of heap size optimization according to the present embodiment described above will be examined in comparison with effects of the approach described in the non-patent document 2.

The method described in the non-patent document 2 described earlier reduces drag time by frequently running GC such that "time interval from creation point to unreachable point"≈"time interval from creation point to collection point", and the "time interval from creation point to unreachable point" is approximated. However, frequently running GC induces a large burden, resulting in extreme throughput degradation. According to the embodiment of the present invention, in contrast, throughput is not remarkably degraded because the number of GC runs is not increased more than needed.

Furthermore, the object profiling technology described in the non-patent document 2 provides in a object a field for profiling and, when an object is created or accessed, collects information and wires it into that field as profiling means. As a result, profiling affects heap management, causing a difference between a reserved heap size and actually usable heap size. According to the embodiment of the present invention, in contrast, information on creation of an object or access to the object is stored in a separate area together with the address for identifying the object at that time. Therefore, usable heap size is not affected.

Moreover, because additional information about a method call/return (method-call and method-return records (records R7 and R8) in FIG. 3B) is added, a method placing a burden on a heap can be identified.

Figures 6A, 6B:
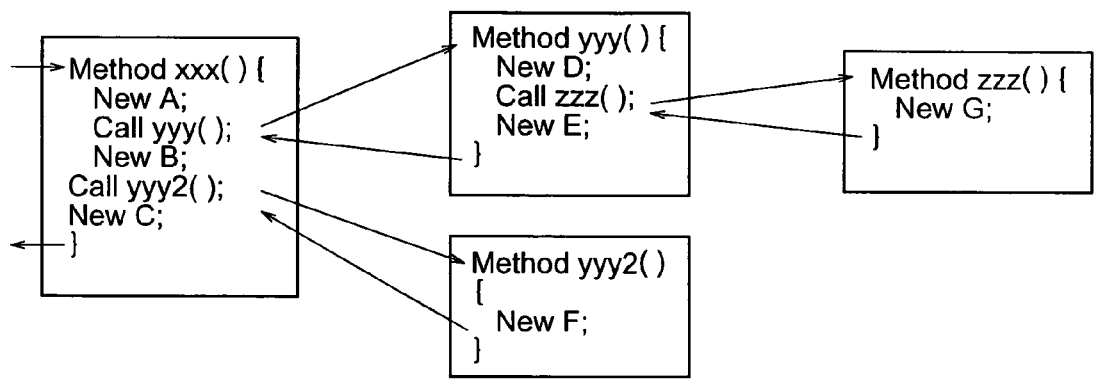
FIGS. 6A and 6B show a diagram for illustrating a process for finding a method that is imposing a burden on a heap according to an embodiment of the present invention.

FIG. 6 is a diagram illustrating a method of finding a method that is imposing a burden on a heap according to an embodiment of the present invention. FIG. 6A shows how methods create objects and call objects and return to a method. FIG. 6B shows in time series the relationship between each method in FIG. 6A and objects it creates. Which object created which object can be readily known because a timestamp is recorded when a method is called or returned.

In FIG. 6A, method xxx creates object A and calls method yyy. Method yyy creates object D and calls method zzz. Method zzz creates object G and returns to method yyy. Method yyy creates object E and returns to method xxx. Method xxx creates object B and calls method yyy2. Method yyy2 creates object F and returns to method xxx. Method xxx creates object C.

In the situation shown in FIG. 6A, the timestamps of the method calls and returns are outputted to a log together with thread numbers and method names. As a result, a chronological order in which the objects were created can be obtained as shown in FIG. 6B. From FIG. 6B, which method created which method created which object can be readily known. Thereby, which method is placing a burden on the heap can be readily researched.

Furthermore, information about the thread that created an object (the thread number of the thread or the like) and information about the thread that accesses the object (the thread number or the like) are written in the log. This allows a particular object is a thread-local or thread-global object to be known.

The structure and operation of the automatic heap size optimizing apparatus 1 shown in FIG. 1 will be further detailed below.

Figure 7:
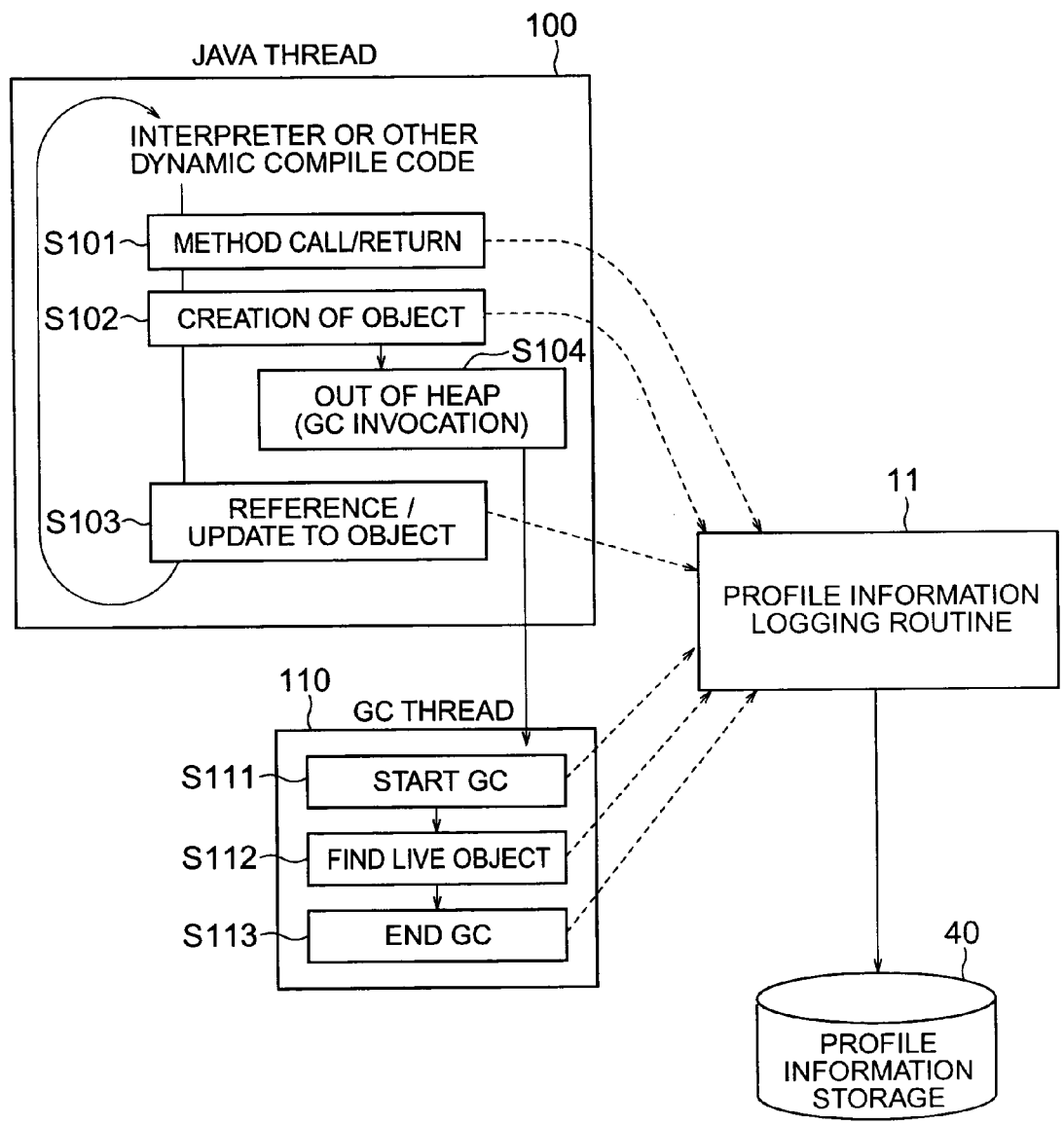
FIG. 7 shows a logging process according to the present embodiment.

FIG. 7 shows a logging process according to the present embodiment. The profile information logging routine 11 of the logging unit 10 logs, when a method is called or returned on a Java thread 100 (step S101), when an object is created (step S102), and when an object is referred to or updated (accessed to the object) (step S103), records in a data record format shown in FIG. 3B and outputs the log into the profile information storage region.

When an object is created on the Java thread 100 (step S102), if the heap is insufficient (S104), GC is invoked.

The profile information logging routine 11 logs, when GC starts on GC thread 110 (step S111), when live object is found by GC (step S112), and when GC ends (step S113), records in the data format shown in FIG. 3B and outputs the log to the profile information storage 40.

Profile information (records to be logged) can be thinned in order to reduce the amount of information held in the profile information storage 40. For example, in order to evenly sample the profile data by using addresses as a key, logging may be performed when the following equation holds:

$$((Ratio>99||Ratio<1)||(int((addr+1)\times Ratio/100)-int(addr\times Ratio/100)) \quad (Eq. 5)$$

where "||" represents "or," "int (X)" represents an integer part of X, "addr" represents an address of an object, "Ratio" represents the ratio of records to log to the entire information in terms of percentage. For example, if Ratio=50 (%), every second event is logged as a record. If Ratio=30 (%), three in every ten events are logged.

Furthermore, rather than continuously collecting all profile information all the way from a startup of the system, profile information may be collected at certain intervals. In practice, enormous records would be collected if profile information is collected continuously. Therefore, it is desirable to provide a function that performs profiling during a certain time interval. For that purpose, profile start and end commands may be defined that allow a user to specify a time interval during which profiling information is collected.

FIG. 8 shows an example in which profiling is started while an application is running. To start profiling while an application is running, in-use heap size Su and the initial values Sg0 of required heap size must be known at the time of starting the profiling. For this end, GC is forced to start when profiling is started. This allows the gross size of objects created before logging is started can be known. Thereafter, there is collected profile information concerning objects that were created/collected during the time interval from the start of profiling until the end of the profiling. Similarly as the time of starting the profiling, when the profile ends, GC is forced to start. This allows the required heap size Sgt to be calculated backward to obtain the required heap size Sgt in the period from the start of logging until the end of the logging regardless of the states before and after the collection period.

While not shown in FIG. 3, when profiling is started and ended during execution of an application, a profile-start record (record R9) and a profile-end record (record R10) are logged together with information such as timestamps or the like at the times of starting and ending the profiling period.

Profiling information collected by the logging unit 10 includes a plurality of records such as records of creation of an object and access or the like to the object for each object. In order to bring together these pieces of information concerning each object, the data organizer 21 in the analyzing unit 20 provides an obj structure for storing the information on an-object-by-object basis. The data organizer obtains a log from the profile information storage region 40, extracts records from the log, writes them in the obj structure for that object, and stores the obj structure in an object information storage 50. Information held by the obj structure is called object information.

FIG. 9 shows a process performed by the data organizer 21 according to the present embodiment. FIG. 9A shows a flowchart of a data organizing process, FIG. 9B shows an example of an obj structure, and FIG. 9C shows members of the obj structure that are updated on creation of an object, access to the object, and GC. FIG. 9D shows transition of the obj structure.

The data organizer 21 extracts one record from the log in the profile information storage region 40 (step S200) and performs a process on the record (step S201) as shown in FIG. 9A. The data organizer 21 repeats these steps until it has processed all the records in the profile information storage region 40 (step S202).

In the process to the record in step S201 shown in FIG. 9A, an obj structure as shown in FIG. 9B is provided for each object for the purpose of organizing profile information by object. In the exemplary obj structure shown in FIG. 9B, "left," "right," "parent," and "balance" in a header part are information used for constructing a consistently balanced binary tree (AVL balance tree).

In data part of the obj structure, "addr" represents the address of the object, "size" represents the size of the objects, and "new_thread" represents the thread that created the object. Furthermore, "new_time" represents the time when the object was created, "last_time" represents the time when the object was last accessed, "age" represents the number of GCs the object underwent, and "is_global" represents whether or not a thread accessed the object is different from the one that created the object (the thread scope).

As shown in FIG. 9C, the members of the obj structure that are updated on creation of an object (new) are "addr," "size," "new_thread," and "new_time." The members that are updated on access to the object (acc) are "last_time" and "is_global." The member that is updated on GC (GC) is "age."

As shown in FIG. 9D, the obj structure transitions among three states "live object set", "CG wait object set" and "collected object set". Each obj structure resides in one of three sets "live object", "GC wait object" and "collected object sets.

An example of the process on records performed in step S201 of FIG. 9A will be described below. The process will be described with respect to each of the record types shown in FIG. 3B.

In the case of record R1 (obj-creation):
(1) Records logged on obj-creation (the address, size, thread number, and timestamp) are extracted from the log in a profile information storage region 40.
(2) One blank obj structure is extracted from "the collected object sets". If there are no blank obj structures, a new one is created.
(3) In the extracted blank obj structure, "addr," "size," "new_thread," and "new_time" are set and the obj structure is registered in "the live object set".

In the case of record R2 (obj-access):
(1) Records on logged obj-access (the address, size, thread number, and timestamp) are extracted from the log in the profile information storage region 40.
(2) An appropriate obj structure is extracted from "the live object set".
(3) In the obj structure, "last_time" is updated. If the thread number of the extracted records is different from the thread number, "new_thread," of the thread in which the object is created, "true" is set in "is_global." If the thread number of the extracted records is an anonymous number, "is_global" is not updated but "new_thread" is updated.

In the case of record R3 (GC-start):
(1) A record (timestamp) logged on GC-start is extracted from the log in the profile information storage region 40 and provides it to an object information storage region 50.
(2) All obj structures in "the live object set" are moved to "the CG wait object sets".

In the case of records R4 and R5 (obj-live (when moved) and obj-live):
(1) Records of obj-live (when moved) (the source address, target address, and size) or records of obj-live (the address and size) are extracted from the log in the profile information storage region 40.
(2) An appropriate obj structure is extracted from "the GC wait object set", 1 is added to "age," and the obj structure is registered in "the live object set". If GC is performed at the start of profiling, no obj structures are included in "the live object set". Therefore, a blank obj structure is extracted from "the collected object set" (if there is no blank object structure, new one is created), the profiling star tie is set in "new_time," an anonymous number is set in "new_thread," the addresses and size are set in "addr" and "size" according to the records, and the object structure is registered in "the live object set".

In the case of record R6 (GC-end):
(1) Records of GC-end (timestamp and the in-use heap size immediately after GC) are extracted from the log in the profile information storage region 40 and provided to the object information storage region 50.
(2) Object information held in all obj structures remaining in "the GC wait object set" is provided to the object information storage region 50.
(3) The obj structures from which the object information is provided to the object information storage region 50 are moved to "the collected object set" so that they can be reused.

In the case of record R7 (method-call):
(1) Records of method-call (the thread number, timestamp, and method name) are extracted from the log in the profile information storage region 40 and provided to the object information storage region 50.

In the case of record R8 (method-return):
(1) Records of method-return (the thread number, timestamp, and method name) are extracted from the log in the profile information storage region 40 and provided to the object information storage region 50.

In the analyzing unit 20, the sorter 22 obtains object information (such as "addr," "size," "new_thread," "new_time," "last_time," "age," and "is_global" or the like) organized by object from the object information storage region 50 and sorts these pieces of object information on the basis of various conditions to profile changes in required heap size and object longevity properties.

FIG. 10 shows an example of object information in the present embodiment. Each obj structure has object information, "addr," "size," "new_thread," "new_time," "last_time," "age," and "is_global", which are organized by object. An example will be described below in which the object information on the three objects shown in FIG. 10 are sorted.

FIG. 11 shows an example of sorting for investigating changes in in-use heap size and active heap size according to the present embodiment.

Before being sorted, the object information on each object in FIG. 10 is divided into two record types, information on the object when it was created and information on the object when it was last accessed, as shown in FIG. 11A. In FIG. 11A, the addr column contains "addr" in the object information. The time column contains "new_time" in the object information on the objects when they were created or "last_time" in the object information on the objects when they were accessed. The total column contains information for obtaining in-use heap size. It contains "size" in the object information when the objects were created or 0 in the object information when the objects were last accessed. The max' column contains information for obtaining active heap size. It contains "size" in the object information on the objects when they were created or "size," sign-reversed, in the object information on the objects when they were last accessed.

FIG. 11B shows the results of sorting the records in FIG. 11A in ascending order of value in the time column. The values in the total' column and the max' column in FIG. 11B are added up in chronological order and written in the total column and the max column in FIG. 11C. In FIG. 11C, the total column indicates changes in in-use heap size, and the max column indicates changes in active heap size.

While not shown in FIG. 11C, if GC occurs during profiling, the size of collected objects is subtracted from the in-use heap size (total) or the in-use heap size is reset to the value immediately after GC. Timestamp data on the start and end of the GC that is stored in the object information storage region 50 may be included in the data to be sorted in FIGS. 11A to 11C.

The information about changes in in-use heap size and active heap size or the like is written in a required heap size data 60. In FIG. 11C, changes in required heap size can be confirmed by multiplying the values of the active heap size (values in the max column) by the drag factor (K, Kn)

described earlier. The information about changes in required heap size thus obtained may be written in the required heap size data 60.

At this time in order to reduce the amount of data, it may be possible to output only representative records among multiple records. For example, in order to reduce the amount of data to 1/10, only the record that has the largest required heap size among the 10 records sorted in chronological order may be outputted. Any other reduction ratio cab be freely changed according to the size of the required heap size data 60.

FIG. 12 shows an example of sorting for obtaining an object longevity characteristic according to the present embodiment. The addr column contains "addr" in the object information and the size column contains "size" in the object information. The longevity column contains the longevity of objects, in which a difference between "new_time" and "last_time" in the object information is recorded. In FIG. 12, the values in the longevity column are sorted in ascending order.

In FIG. 12, the real longevity of each object can be obtained by multiplying the value of the longevity of the object (the value of the longevity column) by the drag factors (K, Kn) described earlier. The object longevity and the real longevity of each object are written in an object longevity characteristic 70. At this time, it may be possible to write either one of the object longevity and the real object longevity.

At this time, in order to reduce the amount of data, it may be possible to output only one representative record among multiple records. For example, in order to reduce the amount of data to 1/10, only every tenth record in the records sorted in ascending order of longevity may be outputted. In such a case, because the longevities of two adjacent records are close to each other, records can be selected at equal intervals to thin out them in this way. Any other reduction ratio may be freely used according to the size of the object longevity characteristic 70.

While in the example shown in FIGS. 11 and 12 "new_thread," "age," and "is_global" data in the object information are not used, these data are used to find the tendency of objects in another standpoint. While data such as method call/return thread numbers, timestamps, method names stored in the object information storage region 50 are not used in the example, these data also are used to find the tendency of objects in another standpoint. If necessary, these data can be included in data to be sorted.

In the analyzing unit 20, the visualizer 23 obtains the required heap size data 60 and the object longevity characteristic 70 and plots each of them by using a technology used in spreadsheet programs. A graph 80 of required and in-use heap sizes is generated from the required heap size data 60 and a graph 90 of object longevity distribution is generated from the object longevity characteristic 70. In order to make the plotting easier, the amount of data (the number of records) may be reduced within the bounds of not loosing required information.

Figure 13:
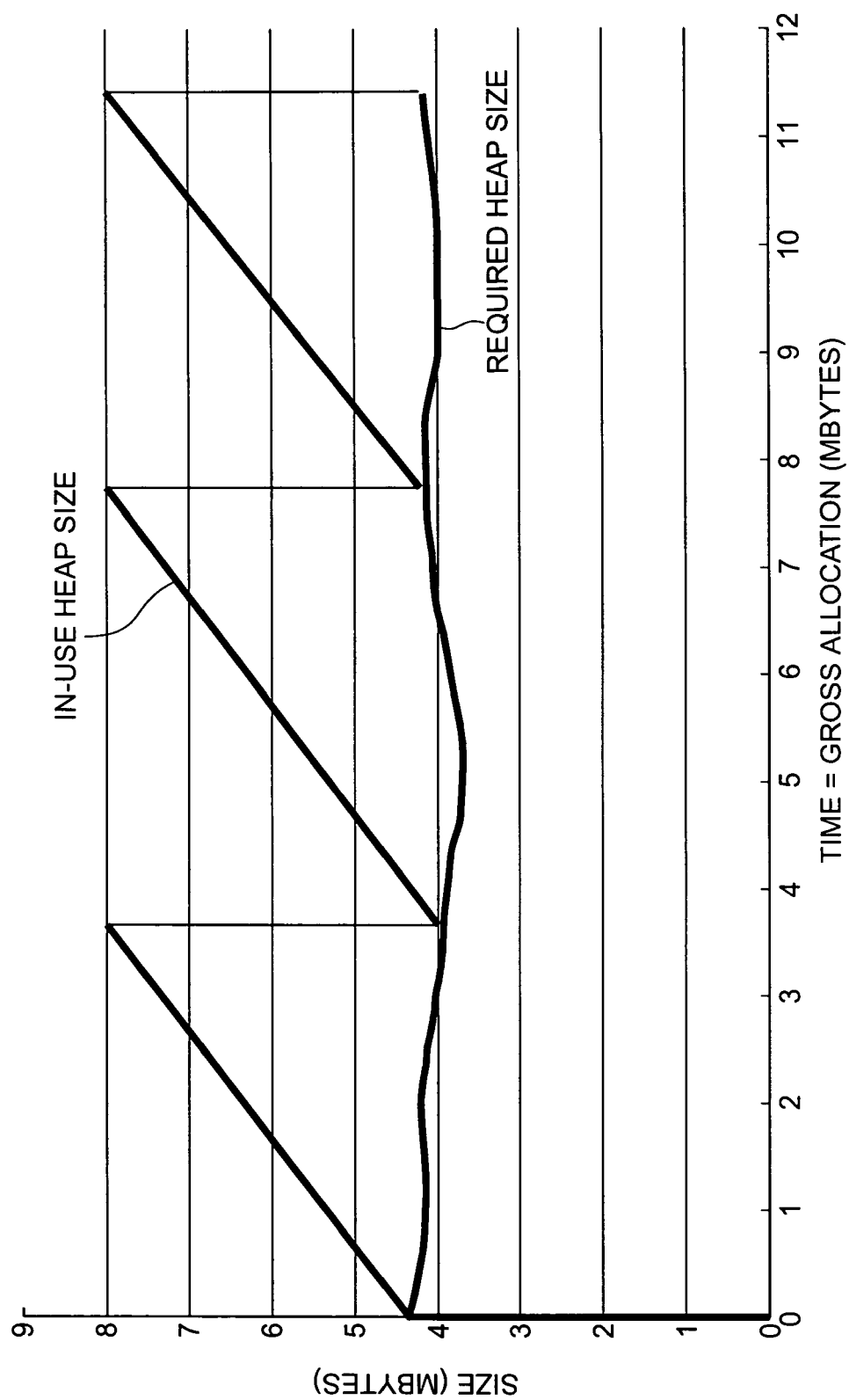
FIG. 13 shows an exemplary graph of required and in-use heap sizes according to the present embodiment.

FIG. 13 shows an example of the require/in-use heap size graph according to the present embodiment. While changes in in-use heap size and required heap size are plotted in FIG. 13, data that can be plotted are not limited to them. For example, changes in in-use heap size and active heap size or changes in in-use heap size, active heap size, and required heap size may be plotted. While the gross amount of allocation (gross allocation size) [Mbytes] is used as the measure of time in the example shown in FIG. 13, actual time [seconds] may be used as the measure.

In FIG. 13, the vertexes of in-use heap size indicate reserved heap size. When in-use heap size reaches the vertexes, GC is performed. In FIG. 13, the reserved heap size is set to about 8 [Mbytes].

Figure 14:
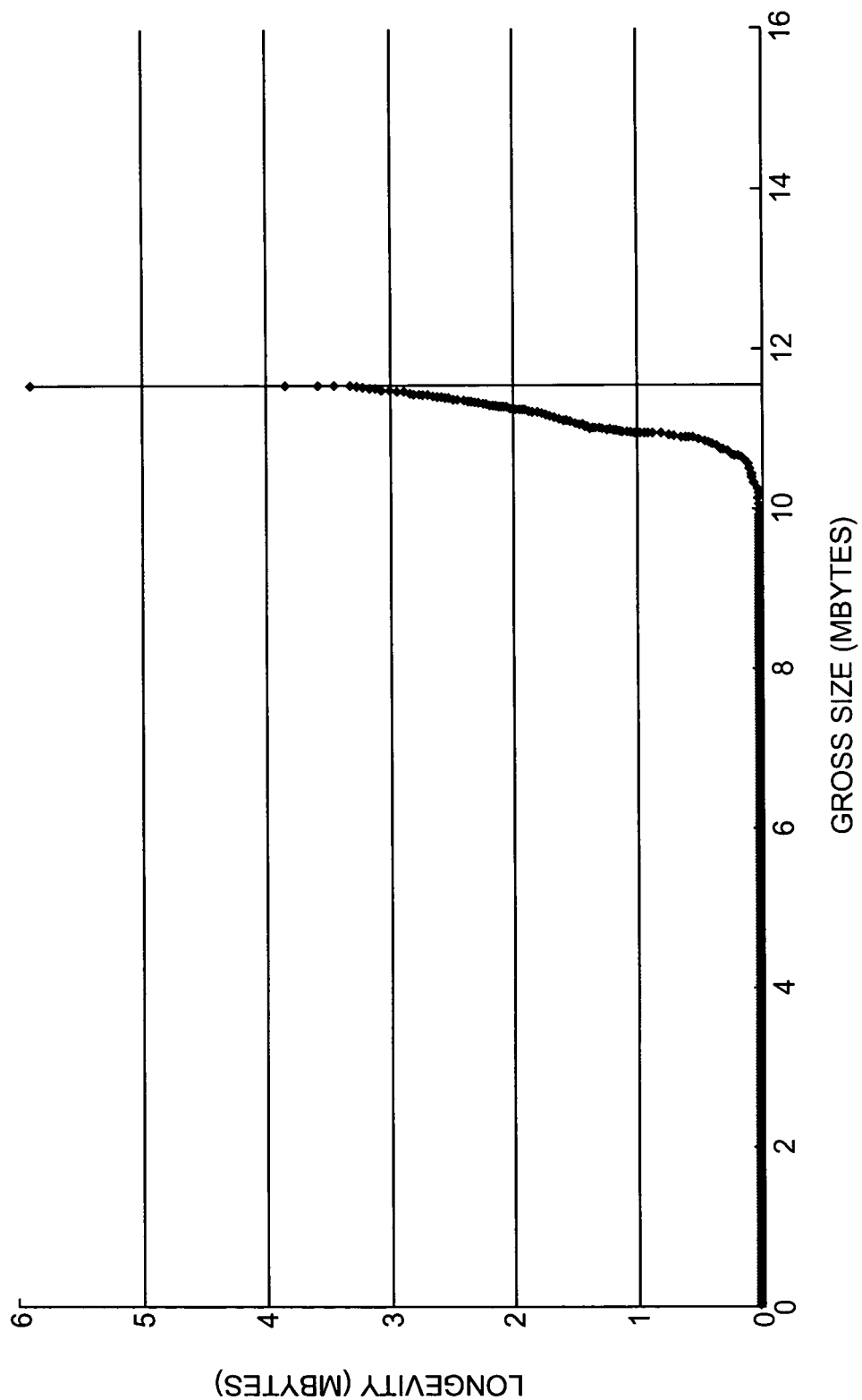
FIG. 14 shows an exemplary graph (1) of object longevity distribution according to the present embodiment.

FIG. 14 shows an example (1) of the object longevity distribution graph according to the present embodiment. Objects are sorted by longevity length and the relationship between the gross size of the objects and longevity is plotted in the ascending order of longevity. While gross allocation size [Mbytes] is used as the measure of longevity in the example in FIG. 14, actual time [seconds] may be used as the measure. The longevity of objects may be the object longevity or real object longevity.

Figure 15:
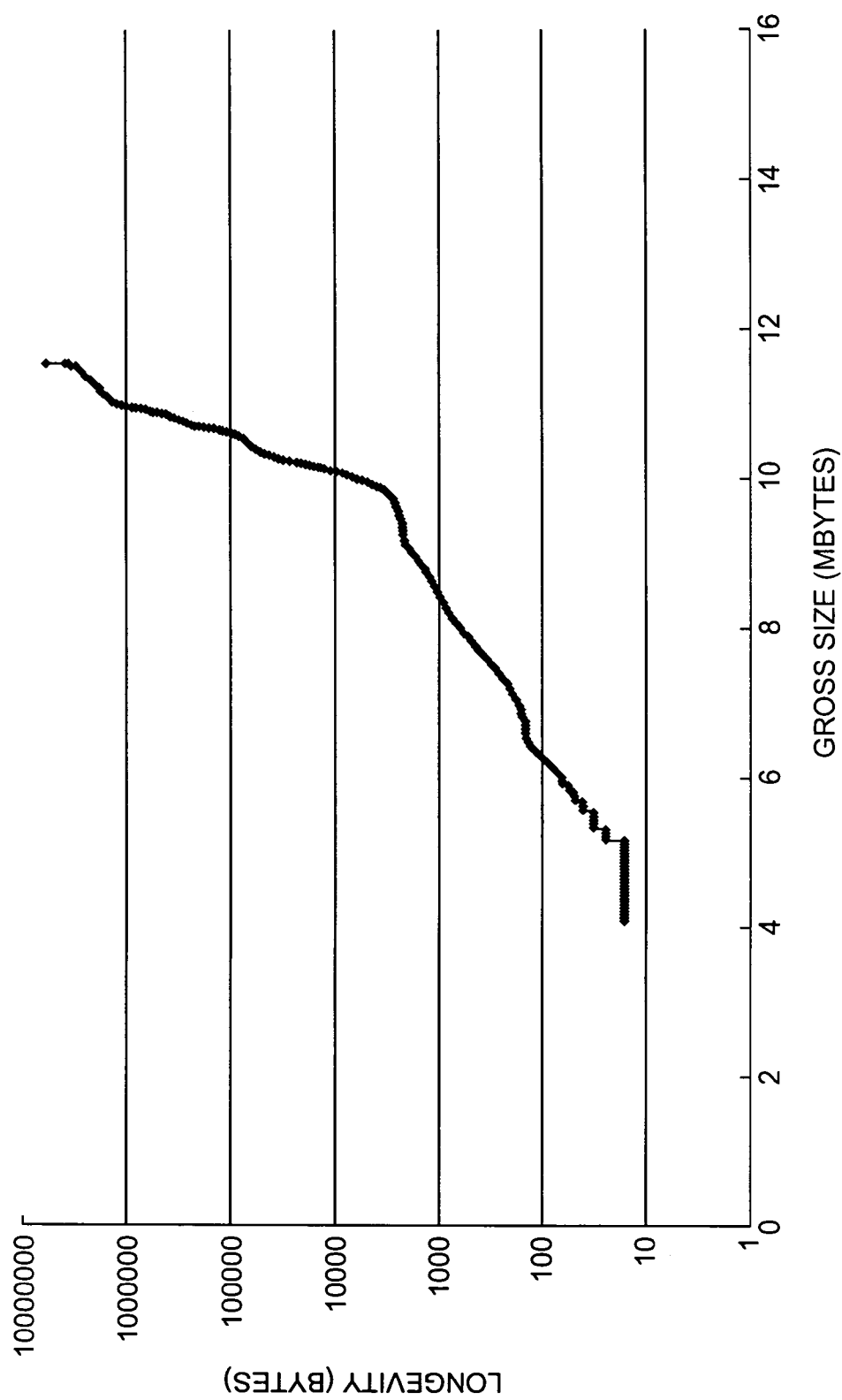
FIG. 15 shows an exemplary graph (2) of object longevity distribution according to the present embodiment.

FIG. 15 shows an exemplary object graph (2) of longevity distribution according to the present embodiment. The graph in FIG. 15 uses a logarithmic scale on the vertical axis for the sake of visual clarity of the graph in FIG. 14. Only data equal to or greater than 4 [Mbytes] are plotted. Whether or not the vertical scale is represented with a logarithmic scale can be selected from a menu or the like.

The estimating unit 30 obtains the minimum required heap size (Sm), a GC interval (Ir) during profiling, and an optimum GC interval (Ii) from the analysis of profile information obtained by the analyzing unit 20 and automatically estimates an optimum reserved heap size (Si) from the obtained values and the reserved heap size (Sr) during profiling.

Figure 16:
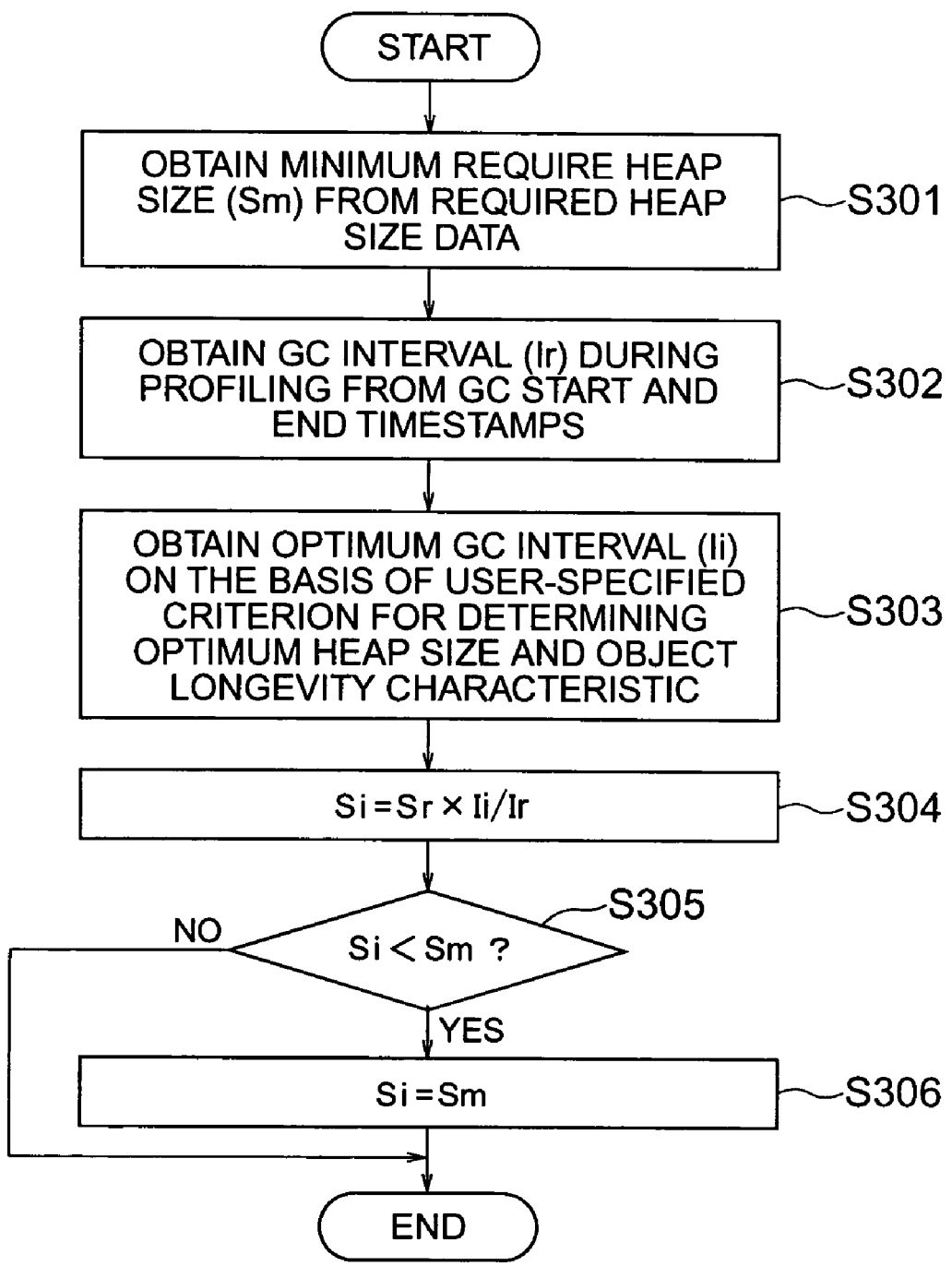
FIG. 16 is a flowchart of an estimation process according to the present embodiment.

FIG. 16 is a flowchart of an estimation process according to the present embodiment. FIG. 16 shows an example in which the criterion for determining the optimum reserved heap size is specified with collectability.

First, the minimum required heap size (Sm), which is the maximum value of required heap size, is obtained from the required heap size data 60 (step S301). At this time, for example, if required heap sizes calculated by multiplying the active heap sizes at given times by a drag factor (K, Kn) are stored in the required heap size 60, the maximum required heap size is chosen as the minimum required heap size (Sm). If the require heap size is not stored in the required heap size data 60, a value obtained by multiplying the maximum value of active by the drag factor (K, Kn) is chosen as the minimum required heap size (Sm).

Then, the GC profile interval (Ir) during profiling is obtained from the timestamps of the start and end of GC which are stored in the object information storage 50 (step S302). For example, the GC interval (Ir) during profiling may be the average of GC intervals in profiling periods.

Next, the optimum GC interval (Ii) is obtained from a criterion specified by a user for determining the optimum heap size and the object longevity characteristic 70 (step S303).

For example, if a collectability of 80% (80% of the gross size of objects, counting from the object having the shortest longevity, do not undergo more than one GC) is specified by the user, data on the object beyond which the gross size exceeds 80%, counting from the object having the shortest longevity in the object longevity characteristic 70 is extracted and the longevity of that object is chosen as the optimum GC interval (Ii).

If the real object longevity obtained by multiplying the object longevity of each object by the drag factor (K, Kn) is written in the object longevity characteristic 70, the real longevity of the object beyond which the gross size exceeds 80% is chosen as the optimum GC interval (Ii). If real object longevity is not written in the object longevity characteristic 70, a value obtained by multiplying the object longevity of the object beyond which the gross size exceeds 80% by the drag factor (K, Kn) may be chosen as the optimum GC interval (Ii).

Next, the reserved heap size (Sr) during profiling, the GC interval (Ir) obtained at step S302, and the optimum GC interval (Ii) obtained at step S303 are used to obtain the optimum reserved heap size (Si) as follows (step S304):

$$Si = Sr \times Ii/Ir \qquad (Eq. 6)$$

The reserved heap size (Sr) during profiling may be recorded beforehand during profiling.

If the optimum reserved heap size (Si) obtained at step S304 is smaller than the minimum required heap size (Sm) obtained at step S301 (step S305), the minimum required heap size (Sm) obtained at step S301 is chosen as the optimum heap size (Si) (step S306). Otherwise, Si obtained at step S304 is chosen as the optimum reserved heap size.

Information obtained by the automatic heap size optimizing apparatus 1 according to the present embodiment is presented to the user on the display or the like. Exemplary screens for providing information to the user will be described with reference to the drawings.

Figure 17:
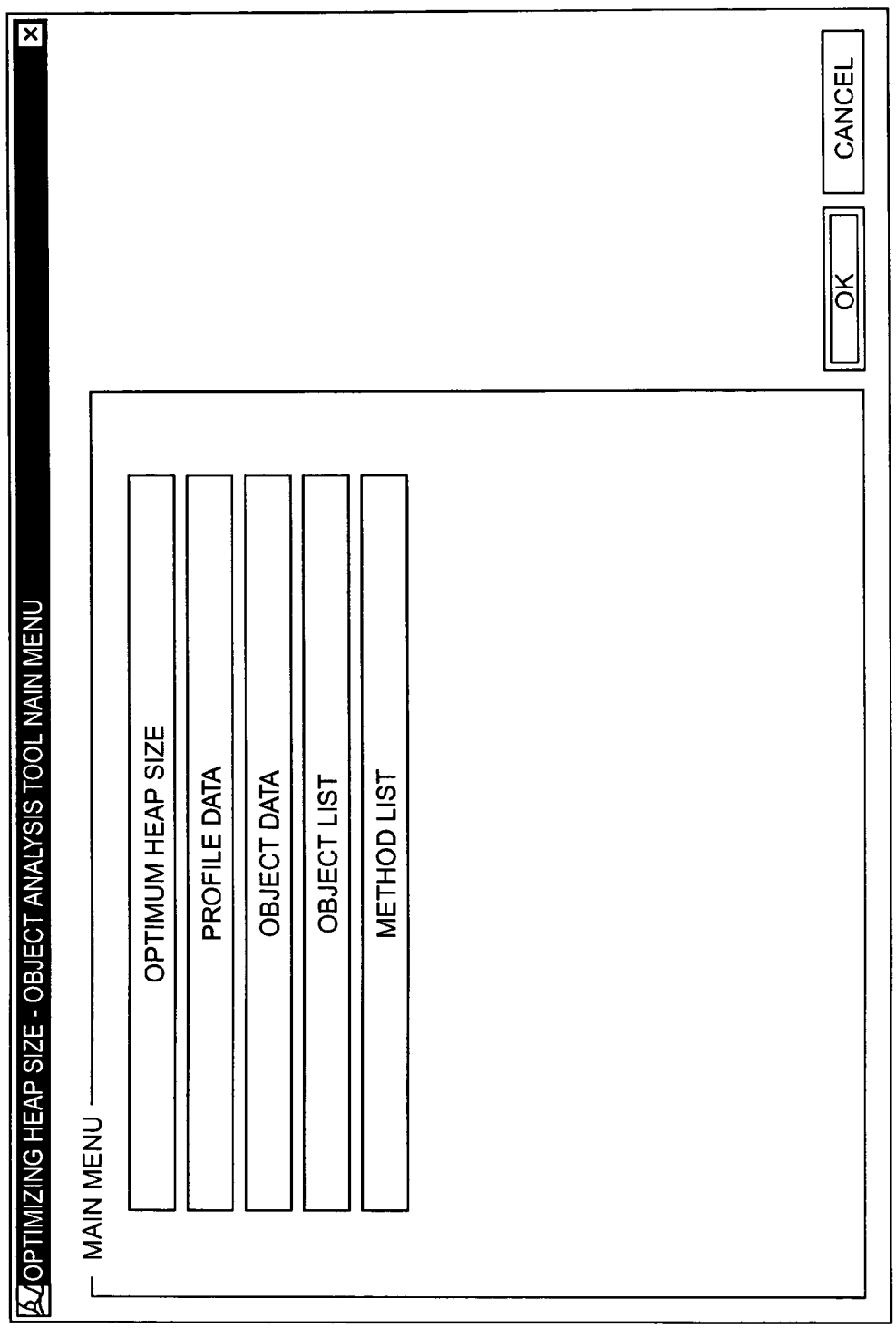
FIG. 17 shows an example of a menu screen for presenting information to a user according to the present embodiment.

FIG. 17 shows an example of a menu screen for presenting information to the user according to the present embodiment. In the menu screen in FIG. 17, the user can select an information item that he or she wants to display from among menu item buttons such as the optimum heap size, profile data, object data, object list, and method list.

Figure 18:
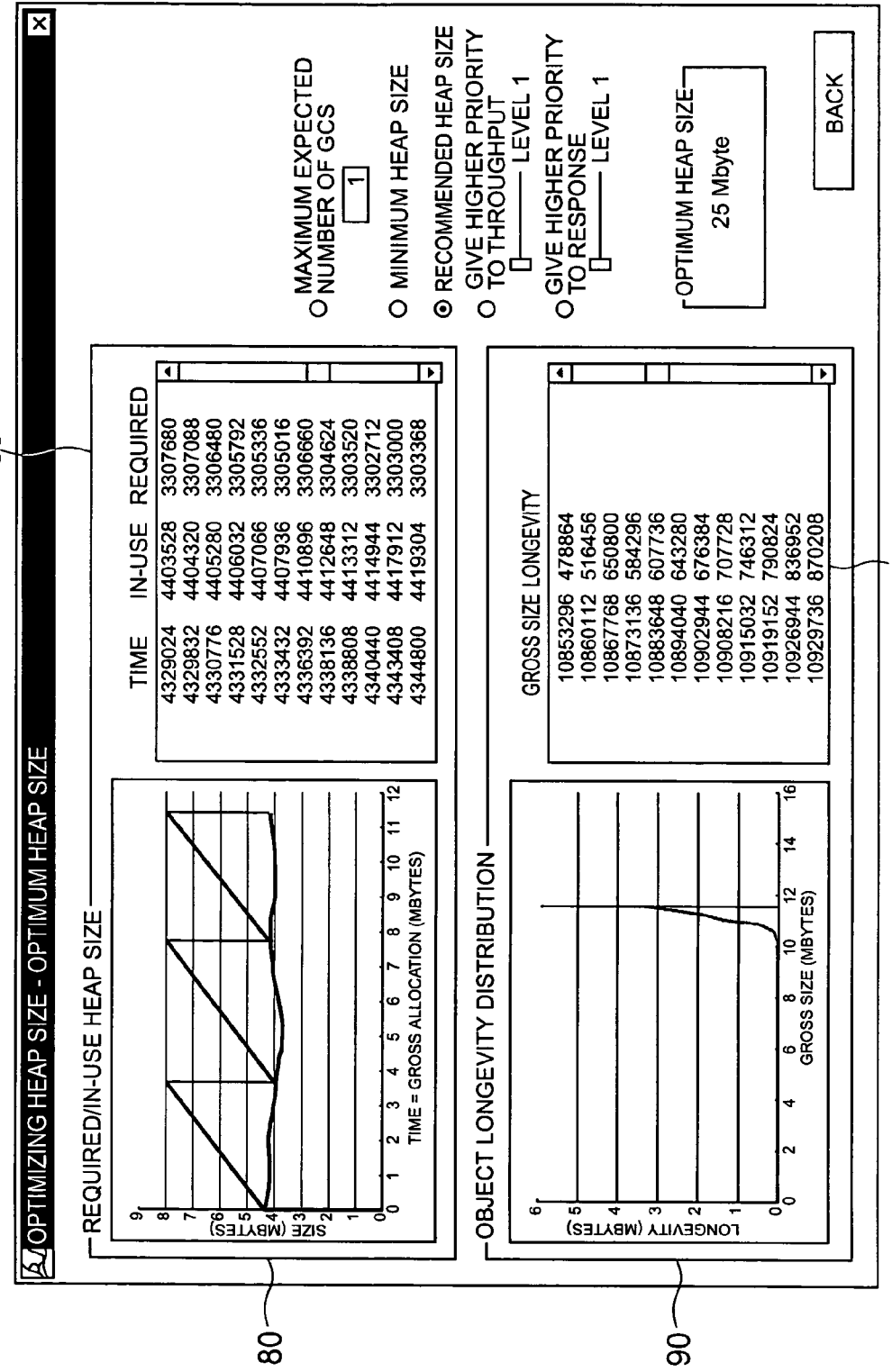
FIG. 18 shows an example of a screen for presenting an optimum heap size according to the present embodiment.

FIG. 18 shows an example of a screen for presenting an optimum heap size according to the present embodiment. In the section of required/in-use heap sizes in the top-left of the screen in FIG. 18, the graph 80 of required/in-use heap sizes and required heap size data 60 are displayed. In the section of object longevity distribution in the bottom-left of the screen, the graph 90 of object longevity distribution and object longevity characteristic 70 are displayed. The user can select data in the required heap size data 60 and the object longevity characteristic 70 to display a threshold line at a potion in the required/in-use heap size graph or object longevity distribution graph that corresponds to the selected data.

The user can specify a criterion for determining an optimum reserved heap size in the center of the right-hand part of the screen. The value of an optimum reserved heap size automatically estimated on the basis of the chosen criterion is displayed on the optimum heap size part at the bottom of the right-hand part of the screen.

When the "Maximum expected number of GCs" option is selected in the section where the user specifies a criterion for determining the optimum reserved heap size, an optimum GC interval is determined so that that all objects do not undergo more GCs than the specified number of GCs and an optimum reserved heap size is automatically estimated on the basis of the optimum GC interval.

When the user selects the "Minimum heap size" option in the section for specifying a criterion for determining an optimum reserved heap size, the minimum required heap size is automatically estimated as the optimum reserved heap size.

When the user selects the "Recommended heap size" option in the section for specifying a criterion for determining an optimum reserved heap size, an optimum reserved heap size predetermined by the system so as to ensure a good balance between throughput and response performance is automatically estimated. In this example, a reserved heap size is estimated so that most (for example 90%) of the objects undergo one GC.

When the user selects the "Give higher priority to throughput" option in the section for specifying a criterion for determining an optimum reserved heap size, higher priority is given to throughput to estimate an optimum reserved heap size. For example, an optimum GC interval that provides a specified level of throughput is determined and the optimum reserved heap size is automatically estimated according to the optimum GC interval.

When the user selects the "Give higher priority to response" option in the section for specifying a criterion for determining an optimum reserved heap size, higher priority is given to response (response performance) to estimate the optimum reserved heap size. For example, an optimum GC interval that provides a specified level of response is determined and an optimum reserved heap size is automatically estimated according to the optimum GC interval.

FIG. 19 shows an example of a profile data screen according to the present embodiment. In the screen shown in FIG. 19, the 1st to 23rd lines indicate exemplary profile data (profile information) on creation of or access to objects, the 24th line indicates exemplary profile data on start of GC, and the 25th to 29th lines indicate exemplary profile data about the objects that remain alive after GC. The numbers at the leftmost part column are sequential numbers for identifying records. In FIG. 19, time is expressed in terms of gross allocation size.

On each of the 1st to 23rd lines, data on the second column from left indicates what kind of event the record concerns. In the example in FIG. 19, "new" indicates a record on object creation and "putfield" and "getfield" indicate records on object accesses (updates/references). Data that follows a colon is the address of the object and the number enclosed in parentheses indicates the size of the object. Data that follows the size indicates the number of a thread in which the object is created or accessed. The rightmost data is a timestamp.

On the 24th line, the data in the second column from left indicates that GC is started. The data in the third column from left is the timestamp of the start of GC. On each of the 25th to 29th lines, the data in the second column from left ("move") represents movement of an object that survived CG and the rightmost data indicates the address to which the object was moved.

FIG. 20 shows an example of an object data screen according to the present embodiment. In FIG. 20, object data (object information) on each object is identified by an object number. Each object has data on size (corresponding to "size"), a thread ID (corresponding to "new_thread"), the time at which the object was created (corresponding to "new_time"), the time at which the object was last accessed (corresponding to "last_time"), its longevity, the number of GCs it underwent ("age"), scope (corresponding to "is_global"), and object name.

In the column of scope (corresponding to "is_global"), "L" indicates thread local and "G" indicates thread global. It can be readily known from this data whether the object is a thread local or thread global object.

Figure 21:
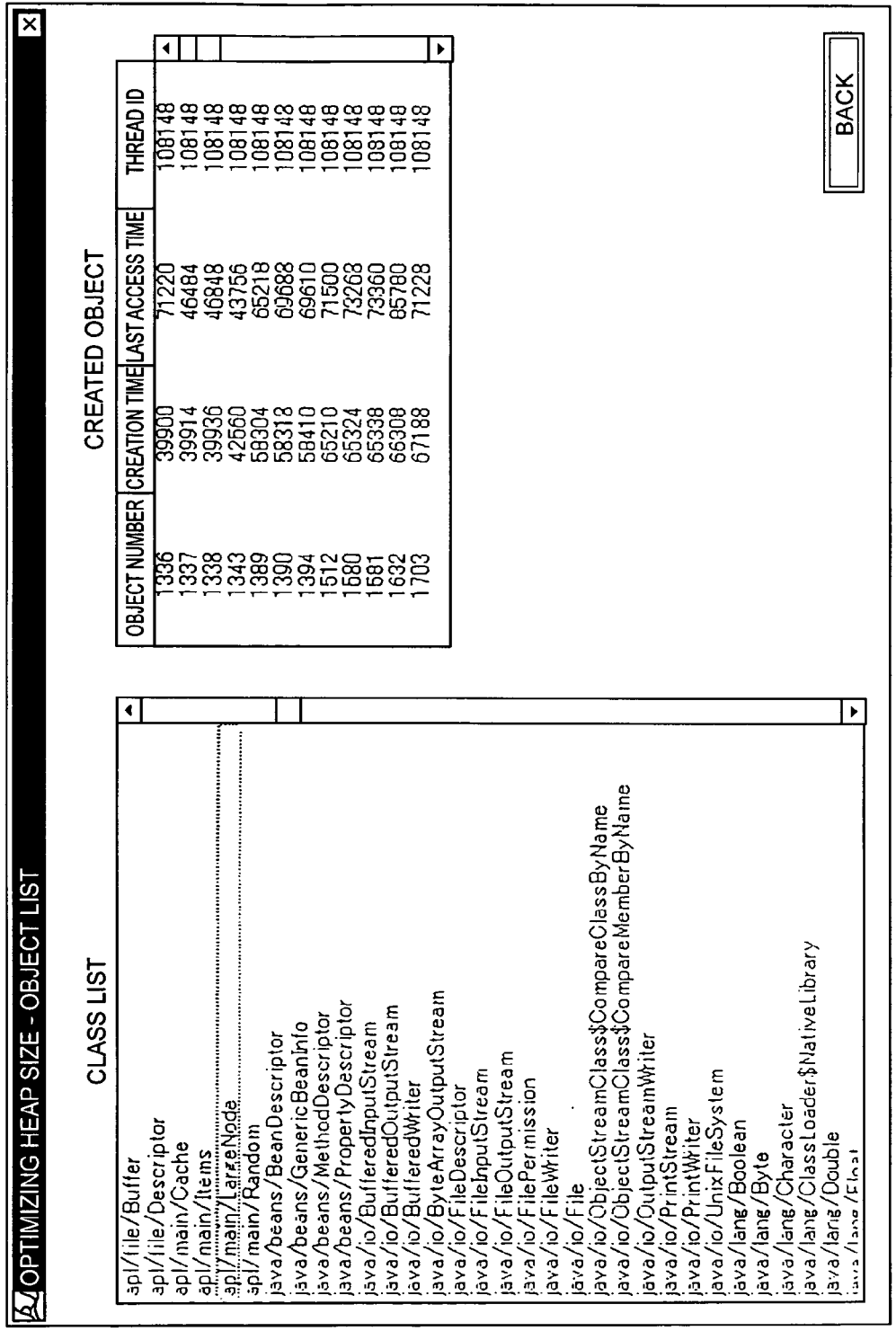
FIG. 21 shows an example of an object list screen according to the present embodiment.

FIG. 21 shows an example of an object list screen according to the present embodiment. The left-hand part of the screen shown in FIG. 21 displays a list of available classes. The user can select a class on the list to know which objects were created (instantiated) from that class. The right-hand part of the screen displays the list of objects created from the selected class.

FIG. 22 shows an example of a method list screen according to the present embodiment. The upper left-hand part of the screen shown in FIG. 22 displays the list of available method. The user can select a class on the list to known the objects accessed by that method.

The upper right-hand port of the screen shown in FIG. 22 displays the list of objects created by the selected method and the lower right-hand part of the screen displays the list of objects accessed by the selected method. From these items of data, the user can readily know which method places a burden on the heap.

As described above, according to the present invention, when a voluntary application is executed in a computer system that implements GC, an optimum heap size can be automatically estimated in terms of collectability of unnecessary objects by GC (throughput performance) and heap usage efficiency (response performance) by profiling the longevities of objects.

Furthermore, additional information on method calls and returns can be logged to provide information about which method creates an object and whether or not an object is a thread local object. The information can be used to optimize the application in terms of heap load management.

What is claimed is:

1. An automatic heap size optimizing method for automatically optimizing a heap size in a computer system that implements garbage collection, the method comprising:
    a first step of collecting and recording profile data concerning identification information, size information, or time information about a created object or a live object for calculating a longevity of the object, at least at creation of the object, at access to the object, and at garbage collection;
    a second step of analyzing the recorded profile data, calculating the longevity of each object, and adding up sizes of live objects to obtain a required heap size at a given time; and
    a third step of determining a target heap size according to a criterion predetermined from a balance between throughput performance and response performance or a criterion specified by an operator by using a longevity characteristic concerning the longevity of each object and the required heap size calculated in the second step;
    wherein a thread number of a thread creating an object is recorded as the profile data at creation of the object in the first step and a thread number of a thread accessing the object is recorded as the profile data at access to the object in the first step, and
        wherein the first step further comprises a step of generating information indicating whether each object is a thread local object or a thread global object from the thread number of the thread that has generated the object and the thread number of the thread that has accessed the object.

2. An automatic heap size optimizing method according to claim 1, further comprising:
    a fourth step of collecting and recording profile data on a method call and a method return; and
    a fifth step of generating and outputting information concerning an object created by each method and an object accessed by each method on the basis of the profile data recorded in the first and fourth steps.

3. An automatic heap size optimizing method according to claim 1, wherein in the analysis in the second step, one object structure is assigned to each object and a plurality of pieces of data concerning the same object are organized into one piece of data according to the recorded profile data for processing.

4. An automatic heap size optimizing method according to claim 1, further comprising the steps of:
    calling for start and end of profile data collection by the first step; and
    invoking garbage collection when the profile data collection is started and ended.

5. An automatic heap size optimizing apparatus in a computer system having a processor and storage, the computer system implementing garbage collection, the apparatus comprising:
    a logging unit to collect and record profile data concerning identification information, size information, or time information about a created object or a live object for calculating a longevity of the object, at least at creation of the object, at access to the object, and at garbage collection;
    an analyzing unit to analyze the recorded profile data, calculating the longevity of each object, and adding up sizes of live objects to obtain a required heap size at a given time; and
    an estimating unit to determine a target heap size according to a criterion predetermined from a balance between throughput performance and response performance or a criterion specified by an operator by using a longevity characteristic concerning the longevity of each object and the required heap size calculated in the analyzing unit;
    wherein a thread number of a thread creating an object is recorded as the profile data at creation of the object in the first step and a thread number of a thread accessing the object is recorded as the profile data at access to the object in the first step, and
    wherein the logging unit further comprises an information generating unit indicating whether each object is a thread local object or a thread global object from the thread number of the thread that has generated the object and the thread number of the thread that has accessed the object.

6. A computer-readable medium storing a program for causing a computer to perform an automatic heap size optimizing method in a computer system that implements garbage collection, wherein the program causes the computer to perform:
    collecting and recording profile data concerning identification information, size information, or time information about a created object or a live object for calculating a longevity of the object, at least at creation of the object, at access to the object, and at garbage collection;
    analyzing the recorded profile data, calculating the longevity of each object, and adding up sizes of live objects to obtain a required heap size at a given time; and
    determining a target heap size according to a criterion predetermined from a balance between throughput performance and response performance or a criterion specified by an operator by using a longevity characteristic concerning the longevity of each object and the required heap size calculated;
    wherein a thread number of a thread creating an object is recorded as the profile data at creation of the object in the first step and a thread number of a thread accessing the object is recorded as the profile data at access to the object in the first step, and
    when the profile data is collected and recorded, information is generated indicating whether each object is a thread local object or a thread global object from the thread number of the thread that has generated the object and the thread number of the thread that has accessed the object.

* * * * *